Figure 1:
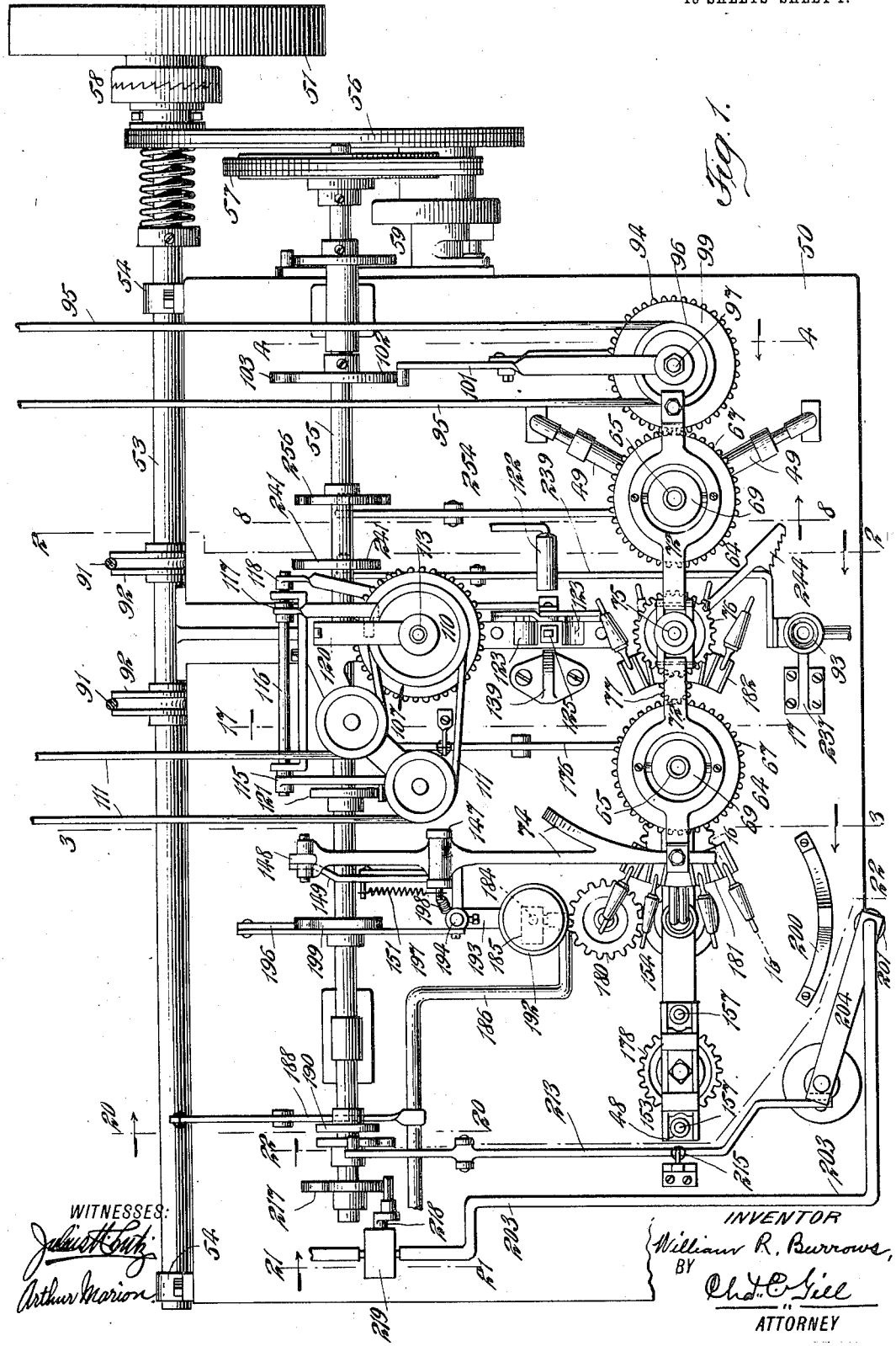

W. R. BURROWS.
MACHINE FOR MAKING VIALS AND THE LIKE.
APPLICATION FILED JAN. 4, 1910. RENEWED OCT. 18, 1911.

1,024,116.

Patented Apr. 23, 1912.

13 SHEETS—SHEET 1.

W. R. BURROWS.
MACHINE FOR MAKING VIALS AND THE LIKE.
APPLICATION FILED JAN. 4, 1910. RENEWED OCT. 18, 1911.
1,024,116.
Patented Apr. 23, 1912.
13 SHEETS—SHEET 4.
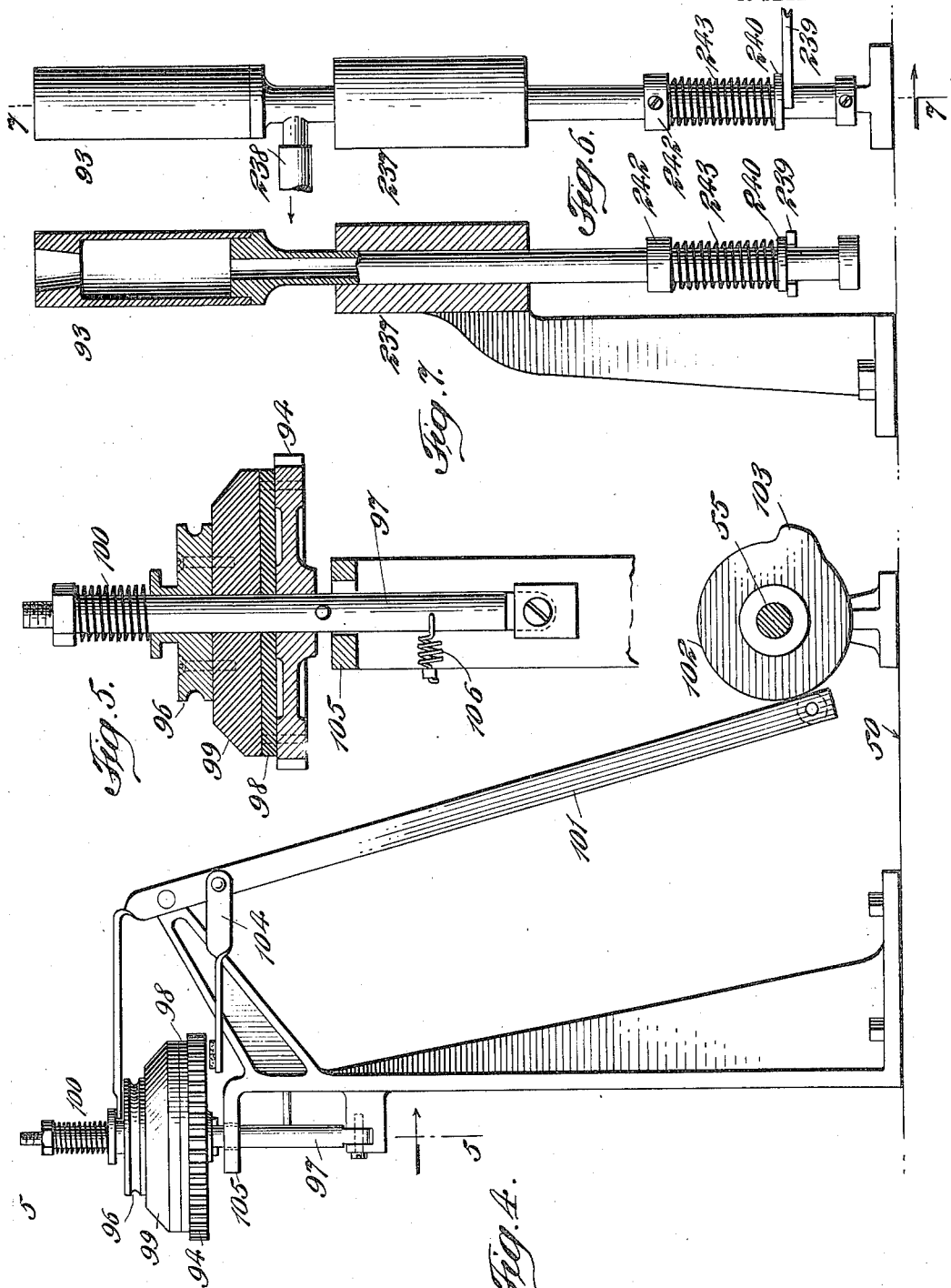

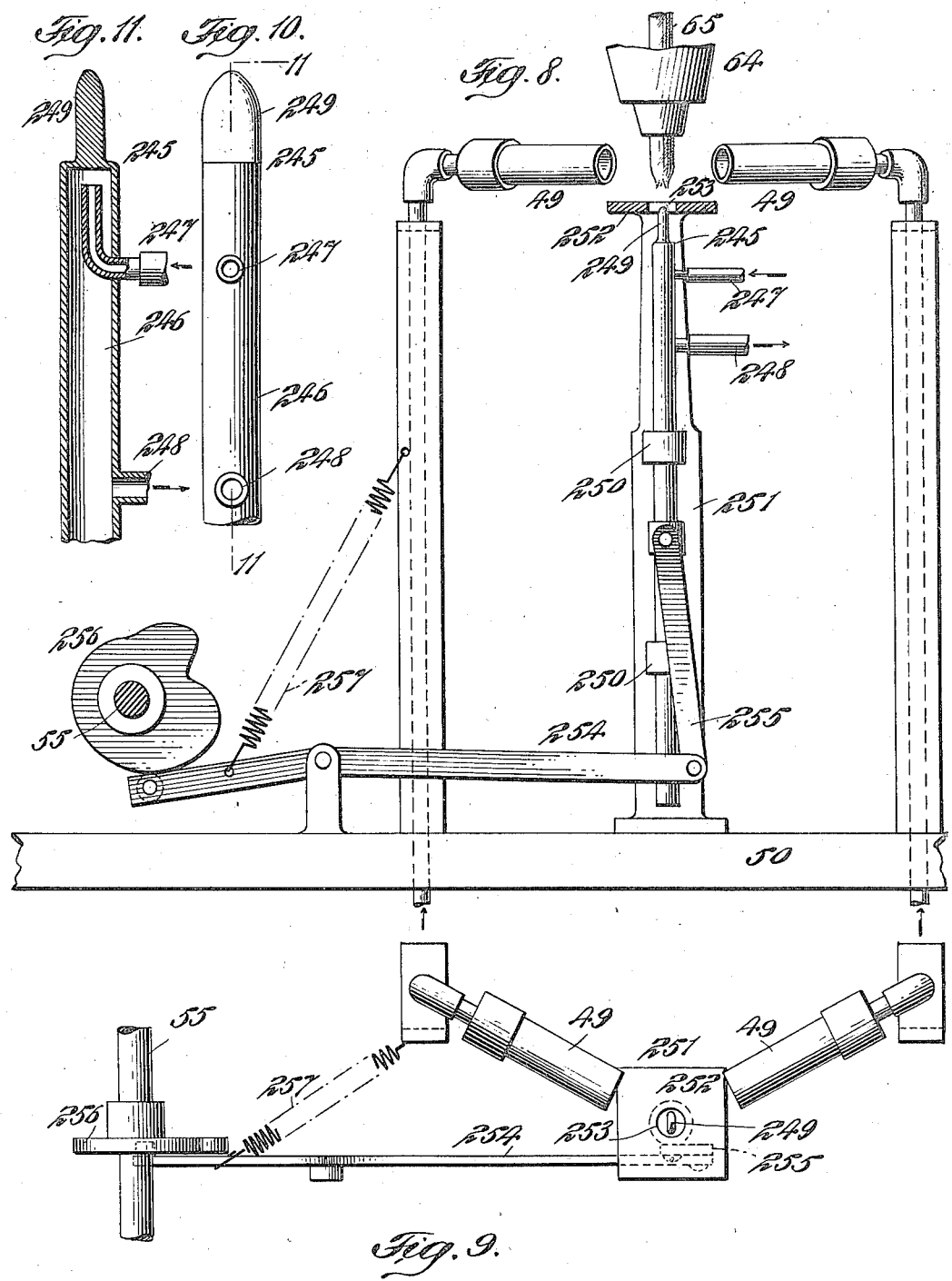

W. R. BURROWS.
MACHINE FOR MAKING VIALS AND THE LIKE.
APPLICATION FILED JAN. 4, 1910. RENEWED OCT. 18, 1911.
1,024,116.
Patented Apr. 23, 1912.
13 SHEETS—SHEET 6.
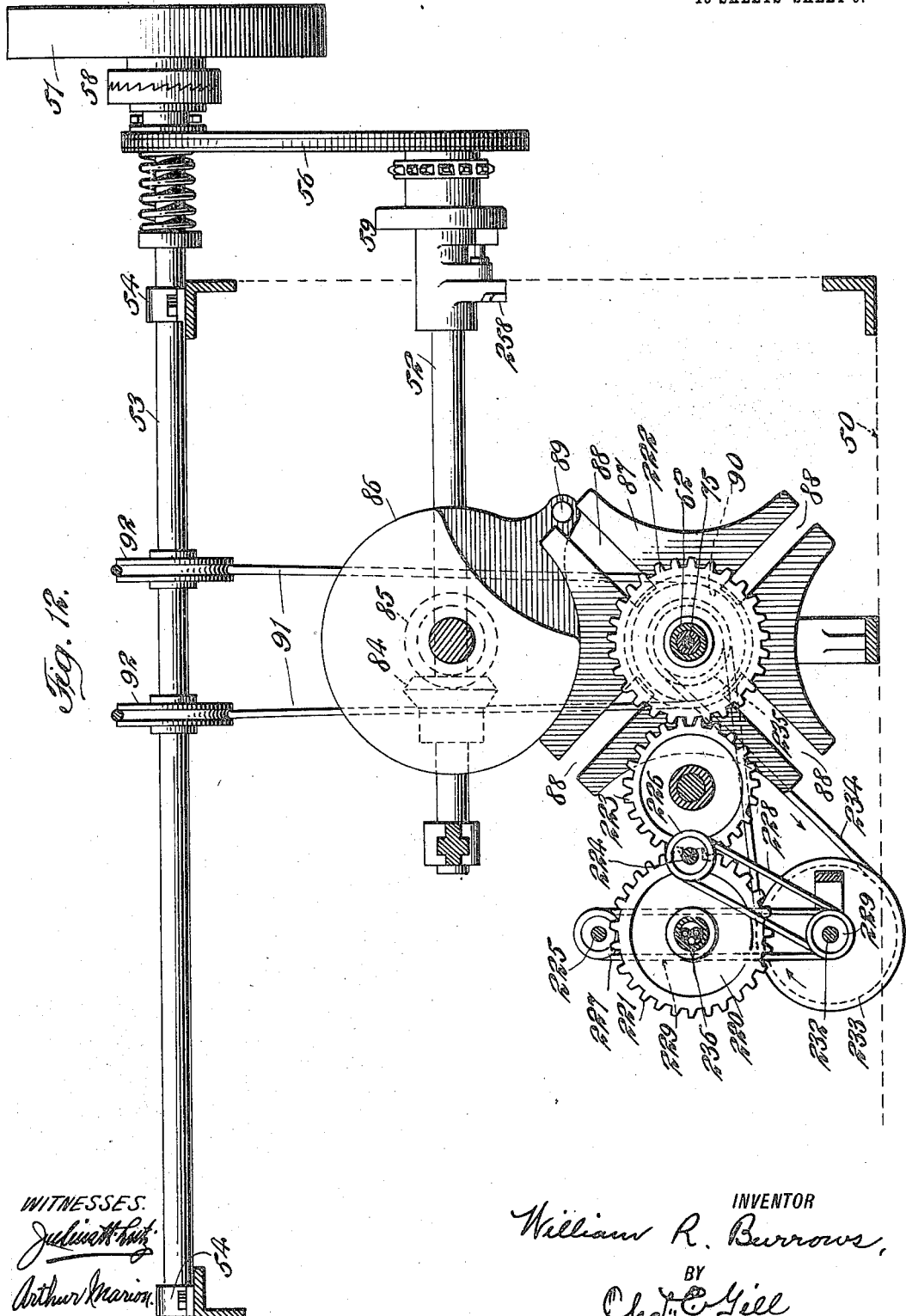

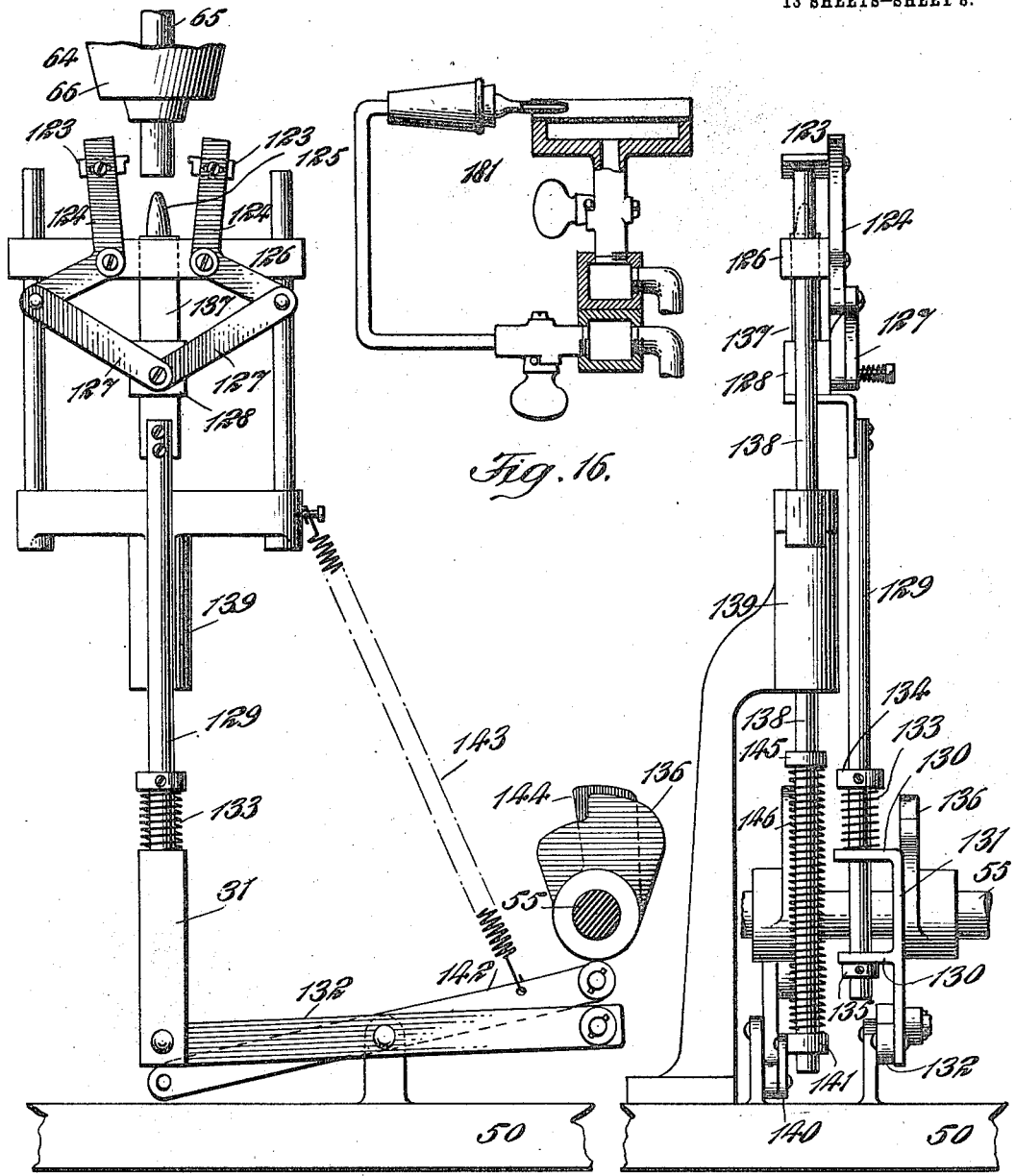

W. R. BURROWS.
MACHINE FOR MAKING VIALS AND THE LIKE.
APPLICATION FILED JAN. 4, 1910. RENEWED OCT. 18, 1911.
1,024,116.
Patented Apr. 23, 1912.
13 SHEETS—SHEET 9.
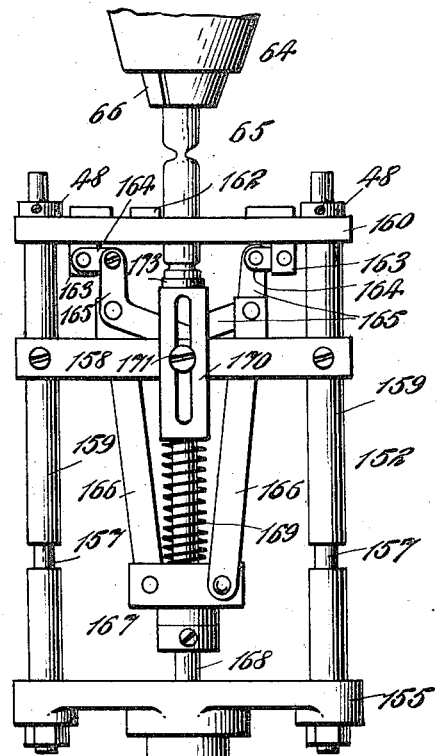
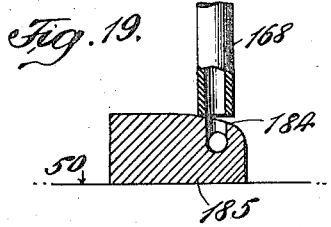
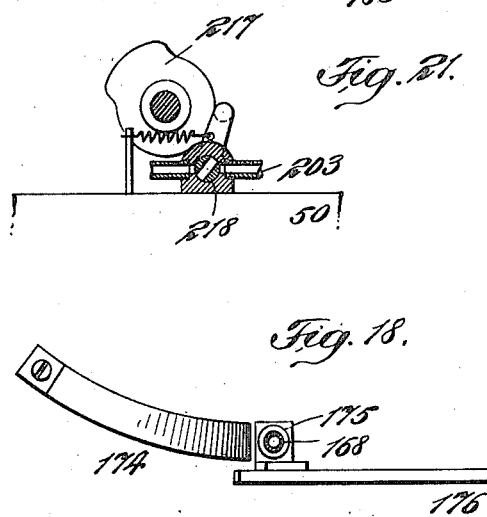
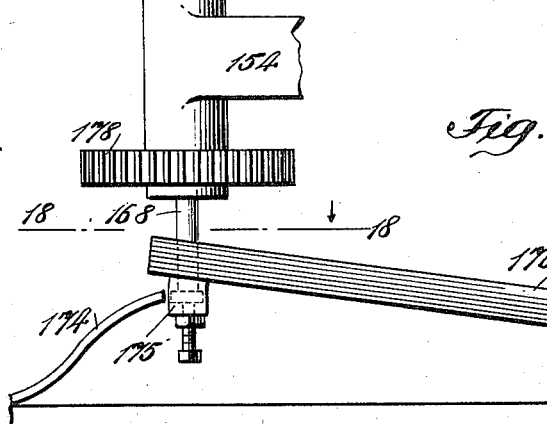
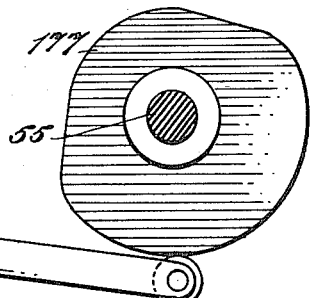
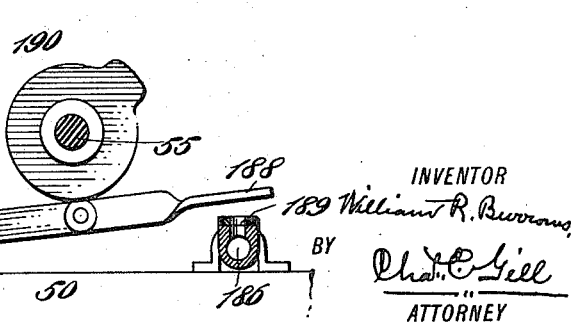
WITNESSES:
Julius H. Kuntz
Arthur Marion
INVENTOR
William R. Burrows,
BY
Chas. E. Gill
ATTORNEY

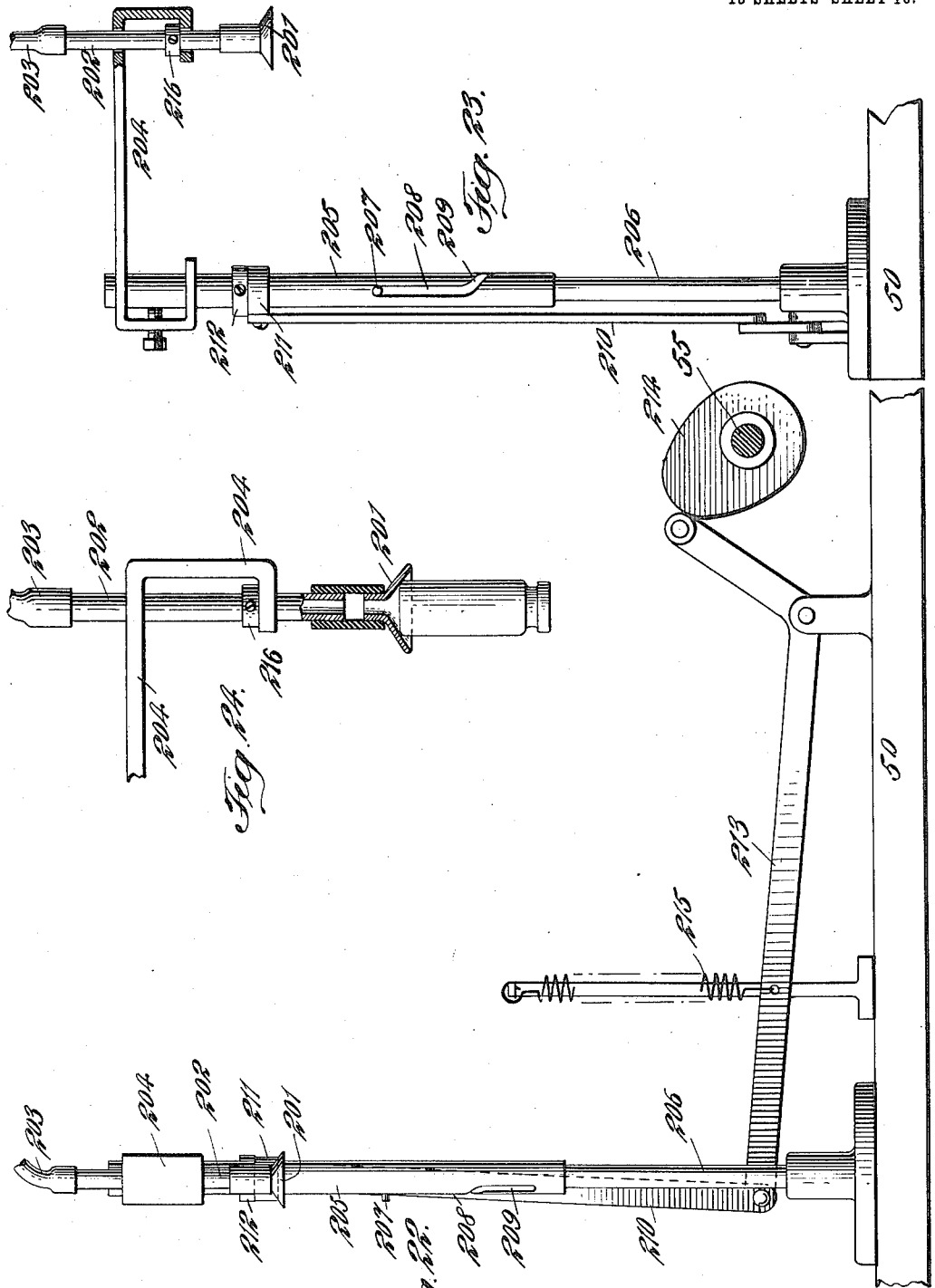

W. R. BURROWS.
MACHINE FOR MAKING VIALS AND THE LIKE.
APPLICATION FILED JAN. 4, 1910. RENEWED OCT. 18, 1911.
1,024,116.
Patented Apr. 23, 1912.
13 SHEETS—SHEET 11.
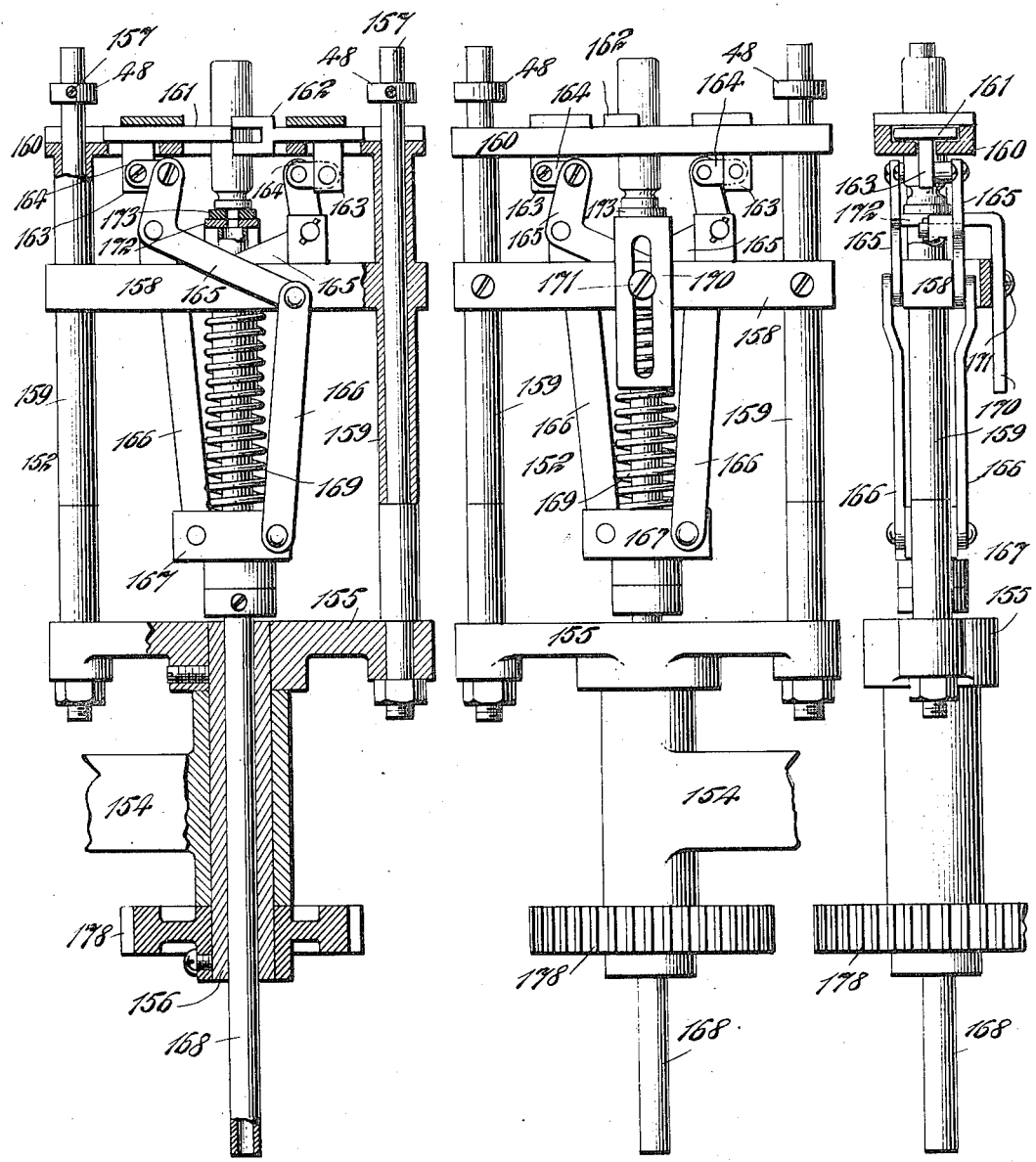
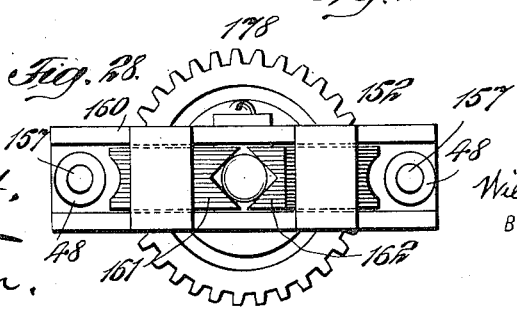
WITNESSES:
INVENTOR
William R. Burrows,
BY
Chas. C. Gill
ATTORNEY W. R. BURROWS.
MACHINE FOR MAKING VIALS AND THE LIKE.
APPLICATION FILED JAN. 4, 1910. RENEWED OCT. 18, 1911.
1,024,116.
Patented Apr. 23, 1912.
13 SHEETS—SHEET 12.
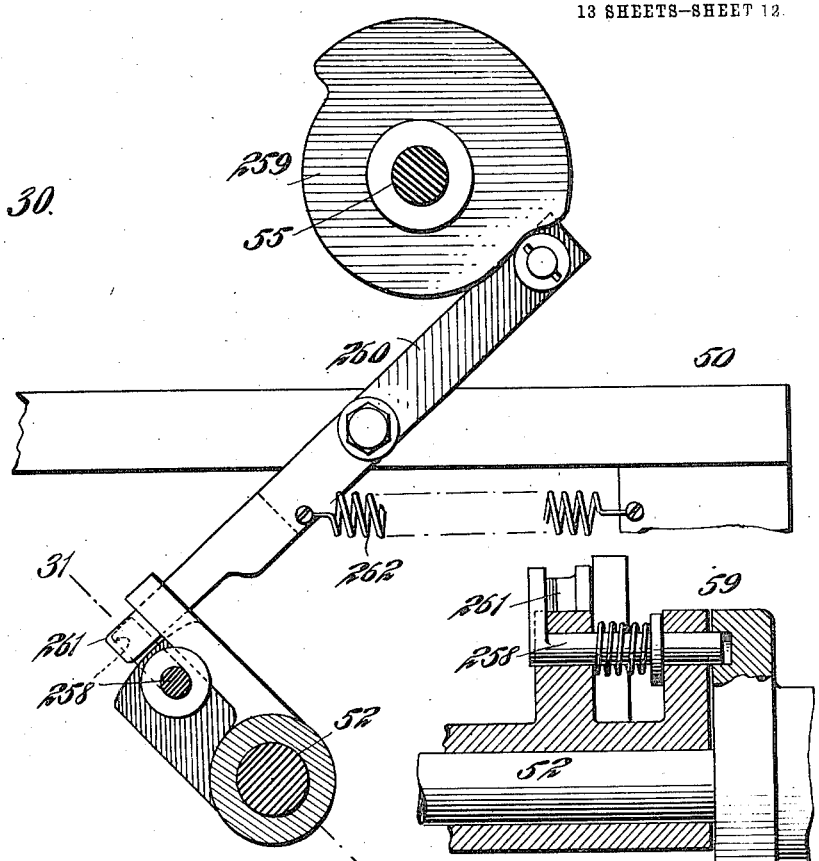
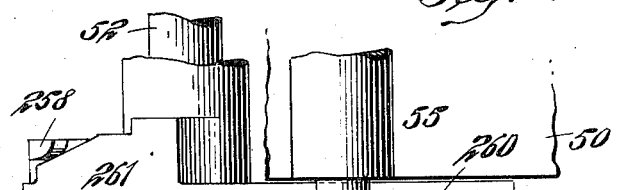
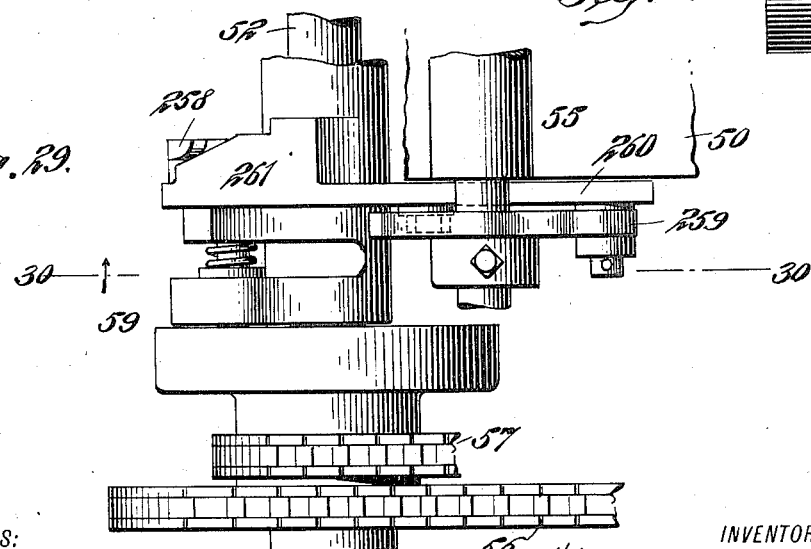

W. R. BURROWS.
MACHINE FOR MAKING VIALS AND THE LIKE.
APPLICATION FILED JAN. 4, 1910. RENEWED OCT. 18, 1911.
1,024,116.
Patented Apr. 23, 1912.
13 SHEETS—SHEET 13.
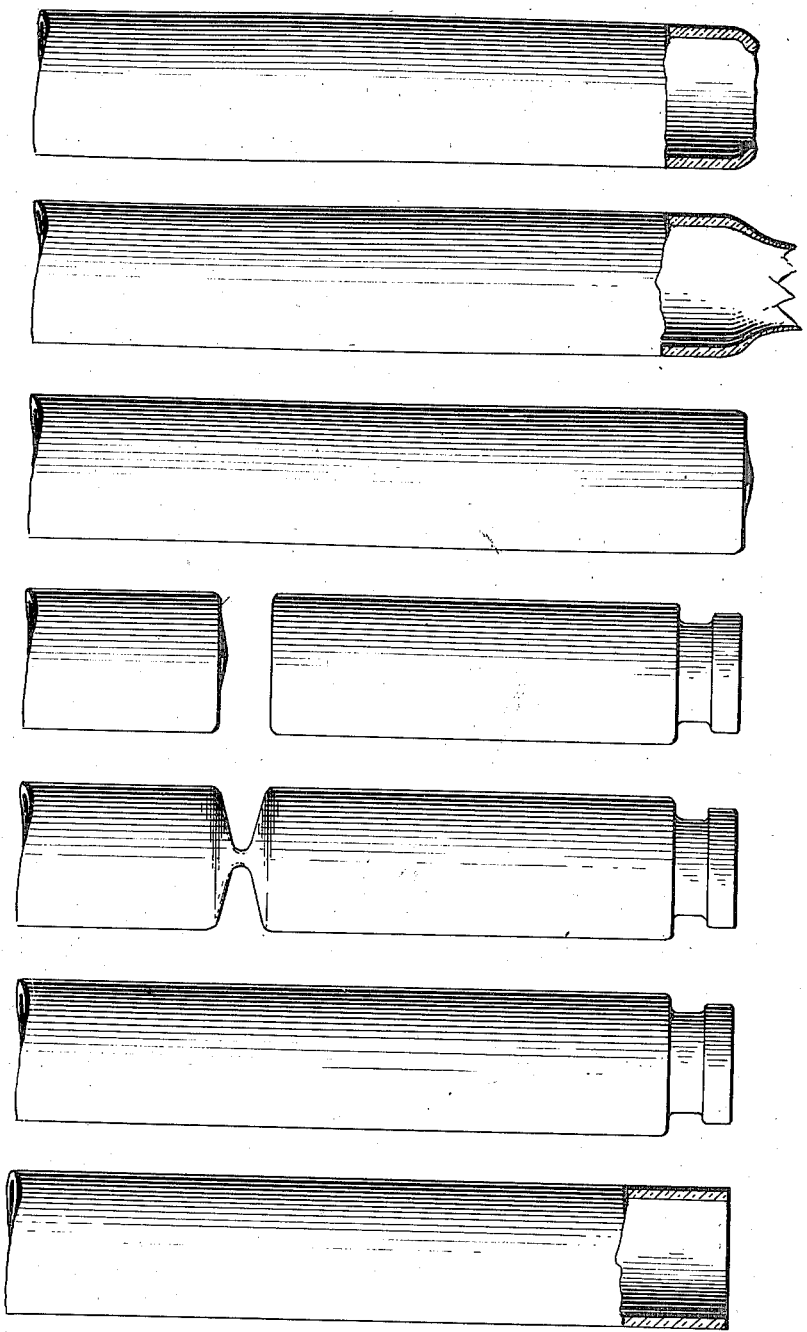
WITNESSES:
INVENTOR
William R. Burrows,
BY
Chas. C. Gill
ATTORNEY

UNITED STATES PATENT OFFICE.

WILLIAM R. BURROWS, OF NEWARK, NEW JERSEY, ASSIGNOR TO GLASS PRODUCTS COMPANY, OF NEWARK, NEW JERSEY, A CORPORATION OF NEW JERSEY.

MACHINE FOR MAKING VIALS AND THE LIKE.

1,024,116.  Specification of Letters Patent.  Patented Apr. 23, 1912.

Application filed January 4, 1910, Serial No. 536,286. Renewed October 18, 1911. Serial No. 655,419.

*To all whom it may concern:*

Be it known that I, WILLIAM R. BURROWS, a citizen of the United States, and a resident of Newark, in the county of Essex and State of New Jersey, have invented certain new and useful Improvements in Machines for Making Vials and the Like, of which the following is a specification.

The invention relates to the manufacture of small glass vials or bottles more particularly of the character used for holding homeopathic medicines, and it consists in the novel machine, features, coöperative mechanisms and method hereinafter described and claimed.

In accordance with my invention the vials are completely made by automatic mechanism from a tube of glass, the tube being of any appropriate initial length and the vials, one after another, being made and severed from the end thereof.

One of the main objects of my invention is to enable the correct and rapid automatic manufacture of the vials, one after another, from the advance end of a glass tube or the advance ends of glass tubes, when more than one tube is handled by the machine. I prefer to so construct the machine that at least two tubes may be fed thereto and vials made from the advance ends thereof by substantially the same set of mechanisms that would be employed if only one tube were fed to and handled by the machine.

The machine of my invention comprises, in the preferred embodiment, a vertical intermittently rotatable frame having horizontal arms provided on their ends with chucks for holding, vertically, the glass tubes from whose lower or advance ends the bottles or vials are made and through which chucks the tubes are fed as the vials are in succession formed from the lower ends thereof, means for forming the lip, neck and shoulder for a vial on the lower end of each tube as the same is carried by said frame thereto, and means for severing by flame-jets the lower section of each tube carried to the proper position for this step by said frame, said flame-jets while severing the lower section of the tube from the body thereof acting to close the upper end of said section and the lower adjacent end of the body of the tube. The severed section of the tube constitutes an inverted vial and is received in a clamp-frame and carried thereby first to means for flattening the upper end thereof and then to a position at which an air-suction nozzle seizes the vial at its closed end and withdraws the same from said clamp-frame and delivers it to any suitable means placed to receive the finished vials, as, for instance, to a chute down which the vials may slide to a conveniently placed box or receptacle.

The means for flattening the closed end of the inverted vial preferably consists of a patter or flat plate lightly applied to the exterior of said end and means for driving air under suitable pressure into the open end of the vial for forcing upwardly any depressed portion of said closed end against the flat lower face of said plate.

The machine also comprises means for preparing the lower closed end of the body of the glass tube from which the section for the vial was severed, for the formation thereat of the lip, neck and shoulder of the next vial to be made, and these means comprise, first, a suction nozzle to which the rotary frame carries the tube and which, by air-suction, draws downwardly in the form of an annular open thin flange the still hot glass which closed the lower end of the tube; and, secondly, a former-plug to which the rotary frame then carries the tube and which, in the presence of heating flames, shapes the lower end of the tube and moves the said flange upwardly or back into the body of the tube, whereby the lower end of the tube is given proper thickness, shape and body to enable the formation thereat of the lip, neck and shoulder for the next vial to be made. The tube is then carried by said rotary frame to the means above referred to for forming the lip, neck and shoulder on the lower end of the tube and then to the position at which the lower section of the tube is severed from the body thereof to constitute an inverted vial, which, as described, is received by a clamp-frame and by it carried first to means for flattening the closed end of the vial and then to a position at which the suction-nozzle extracts the finished vial from said clamp frame and delivers it to a suitable discharge.

Figure 2:
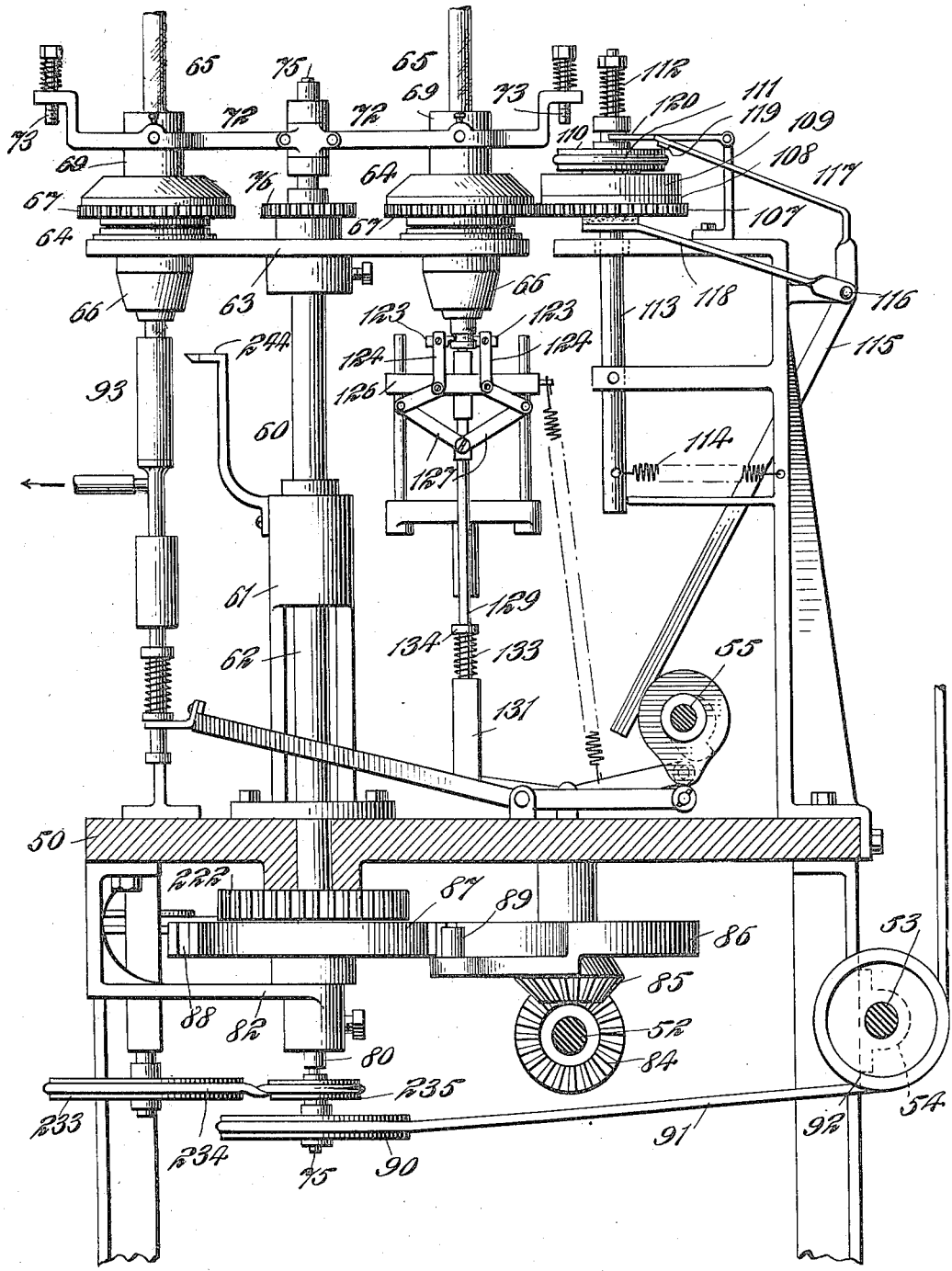
Figure 3:
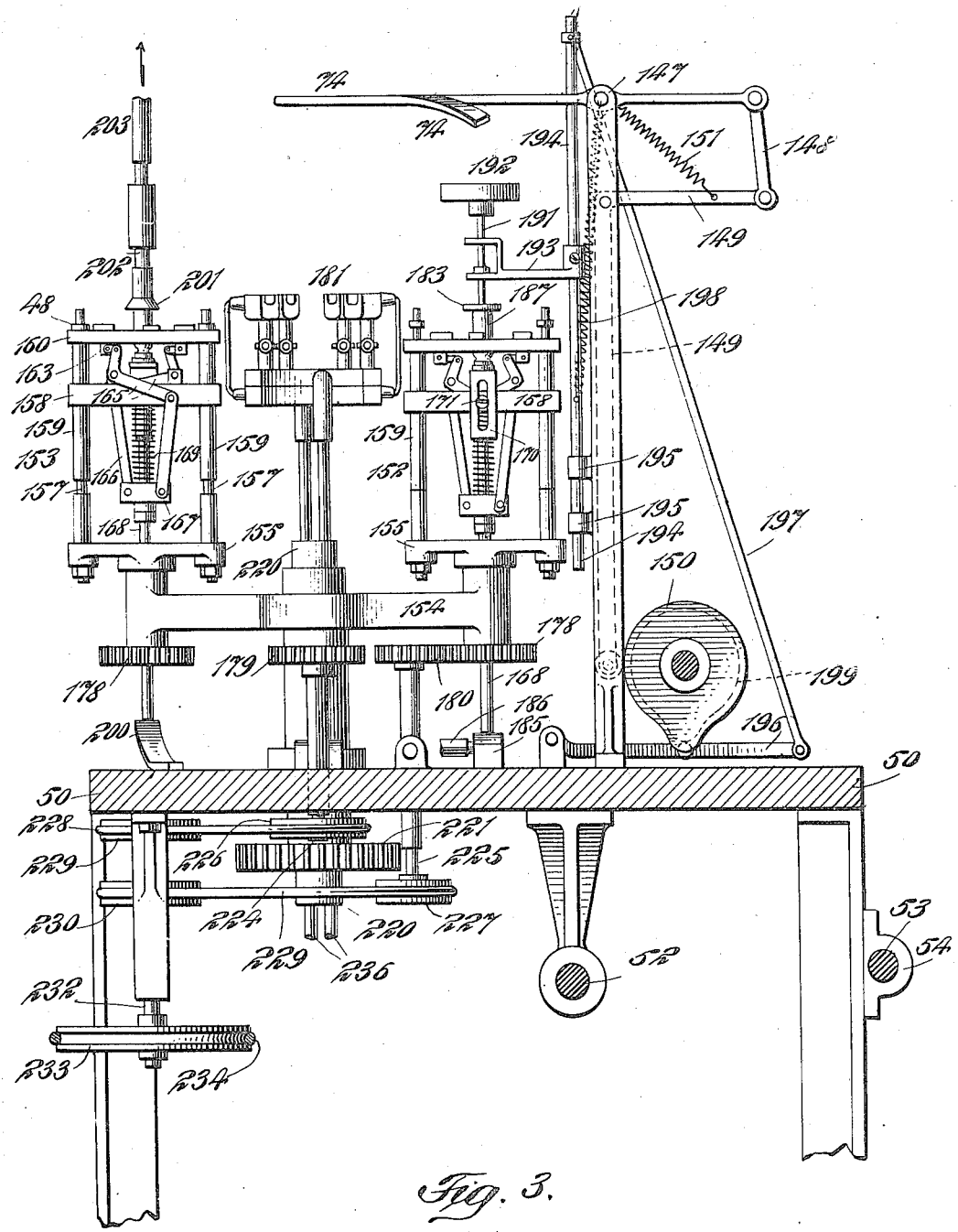
Figure 13:
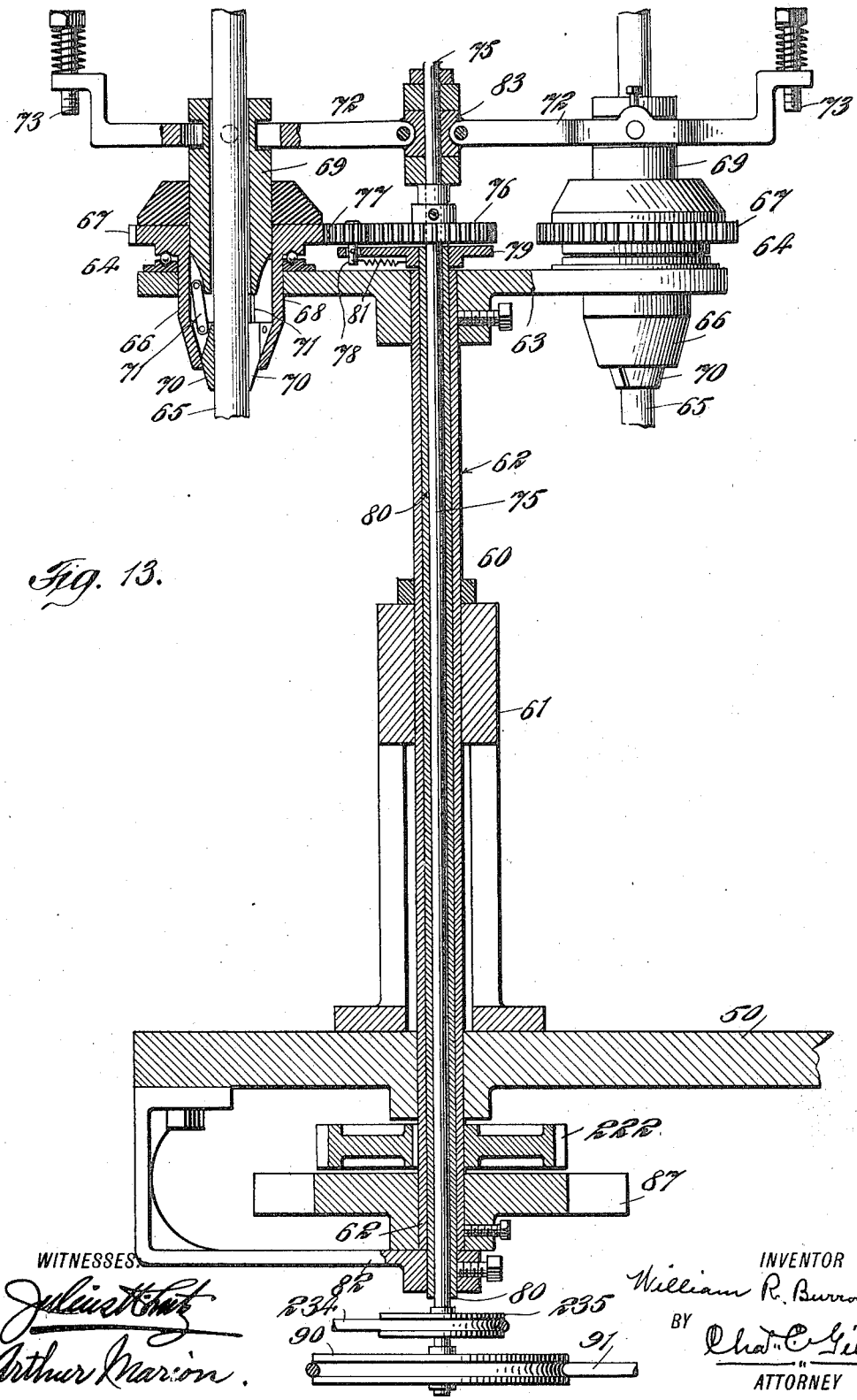

The invention will be fully understood from the detailed description hereinafter presented, reference being had to the accompanying drawings, in which:

Figure 1 is a top view of a machine constructed in accordance with and embodying my invention; Fig. 2 is a vertical longitudinal section of the same on the dotted line 2—2 of Fig. 1, but illustrating the rotatable glass-tube carrying frame as having made a quarter turn from the position in which it is shown in Fig. 1; Fig. 3 is a like section of the same on the dotted line 3—3 of Fig. 1; Fig. 4 is a like section through a portion of the machine on the dotted line 4—4 of Fig. 1; Fig. 5 is a detached vertical section through the gear mechanism shown in Fig. 4, taken on the dotted line 5—5 of Fig. 4; Fig. 6 is an enlarged side elevation of a vertically movable suction-nozzle to which in the use of the machine the end of a glass tube closed by the severance of a section therefrom by heat, is applied for the purpose of having said closed end, which is still hot, drawn downwardly and opened, Fig. 36 showing the nature of the closed end before being applied to said suction-nozzle and Fig. 37 illustrating the effect of the suction on said end; Fig. 7 is a vertical section of the same on the dotted line 7—7 of Fig. 6; Fig. 8 is a side elevation, partly in section on the dotted line 8—8 of Fig. 1, of the means for thickening up the drawn-out edges of the end of the tube (Fig. 37) preparatory to the formation thereat of the usual stopper-receiving head and neck of a bottle, the effect of said means being the transformation of the end of the tube from the condition shown in Fig. 37 to that illustrated in Fig. 38; Fig. 9 is a top view of the same; Fig. 10 is an enlarged detached elevation of the upper portion of a vertically movable water-cooled former or plug constituting a portion of the mechanism shown in Fig. 8; Fig. 11 is a vertical section of the same on the dotted line 11—11 of Fig. 10; Fig. 12 is a horizontal section of the machine taken on a line just below the top of the bed plate of the machine and is presented more particularly to illustrate the means actuated from a driven shaft for imparting motion to certain operative parts of the machine; Fig. 13 is an enlarged view, partly in central vertical section and partly in side elevation, of the rotatable frame which by intermittent movements carries the glass tubes (two tubes being shown) to the several positions in which the lower end portions thereof are converted into completed bottles, said frame being shown wholly in side elevation in Fig. 2 and its intermittent operating gear being shown in Fig. 12; said rotatable frame is shown as having two chucks each holding a glass tube; Fig. 14 is a detached enlarged side elevation of the mechanism for forming the bottle-head on the end of the glass tube; Fig. 15 is an edge elevation, taken from the left, of the mechanism illustrated in Fig. 14; Fig. 16 is an enlarged sectional view through a portion of one of the burners utilized for severing an appropriate lower section of the glass tube from the remaining portion thereof and forming closed ends at the adjacent portions of said severed section and the body of the tube, the sectional portion of Fig. 16 being taken on the dotted line 16—16 of Fig. 1; Fig. 17 is a sectional view through a portion of the machine on the dotted line 17—17 of Fig. 1 and illustrates at its upper part the action of the burner shown in Fig. 16 in severing the lower section of the glass tube from the body-portion thereof and forming the closed ends on the upper end of said lower section and the adjacent lower end of the body of the tube; Fig. 18 is a horizontal section through a portion of Fig. 17 on the dotted line 18—18 of said Fig. 17; Fig. 19 is a vertical section of a portion of the means for blowing air into the lower end of the substantially completed bottle after it has been severed in the manner indicated in Fig. 17 and the operation of flattening the closed end or bottom of the bottle is taking place; Fig. 20 is a vertical section of a portion of the machine on the dotted line 20—20 of Fig. 1, and illustrates a portion of the mechanism for delivering the air into the lower end of the inverted substantially completed bottle during the step of flattening the closed end thereof; Fig. 21 is a sectional view through a portion of the machine on the dotted line 21—21 of Fig. 1, and illustrates the valve mechanism for controlling the air suction through a flexible pipe having a nozzle on its end utilized for lifting each bottle as finished from its retaining means and delivering it to a suitable discharge from the machine; Fig. 22 is a side elevation, partly broken away, of a portion of the mechanism connected with the valve shown in Fig. 21, for removing the finished bottles from the machine; Fig. 23 is an edge view, partly in section, of the same taken from the left hand side of Fig. 22; Fig. 24 is a detached view, partly in section, of the nozzle portion of the mechanism for lifting each finished bottle, by air suction, from its final holding means and delivering it to the discharge from the machine; Fig. 25 is a side elevation, partly in section, of a holding frame in which the bottle is held during the final step in its completion, the bottle being shown in position therein; Fig. 26 is a side elevation of the same, taken from the reverse side of Fig. 25; Fig. 27 is an edge view, partly in section, of the same; Fig. 28 is a top view of the same, the bottle being shown in position between the retaining jaws; Fig. 29 is a detached enlarged top view of a portion of the driving and clutch mechanism of the machine; Fig. 30 is a vertical section of the same, taken on the dotted line 30—30 of Fig. 29; Fig. 31 is a sectional view of a portion of the same taken on the dotted line 31—31 of Fig. 30; and Figs. 32 to 38 inclusive represent the various steps during the operation of the machine in the formation of the completed bottle from the lower end of a glass tube, Fig. 32 representing a section of an ordinary glass tube as fed to the machine, Fig. 33 the formation on the lower end of the tube of the lip, neck and shoulder or the head for the bottle, this formation being imparted to the end of the glass tube by the means shown in detail in Figs. 14 and 15, Fig. 34 that step in the process which involves the severing, by means of heat, of the lower section of the glass tube from the body thereof and the formation of the bottom for said lower section, which, when completed, forms the bottle, Fig. 35 the glass tube with the lower section severed therefrom, and with the upper end of said lower section and the lower end of the body of the tube closed by the heat used in severing said lower section, Fig. 36 the glass tube, with its closed lower end ready for the formation of another vial or bottle therefrom, Fig. 37 the step in the operation carried out by the mechanism shown in Figs. 6 and 7 in, by means of air suction, opening and pulling downwardly the material closing the lower end of the tube shown in Fig. 36, and Fig. 38 the result of the next step in the process consisting in thickening up and shaping the lower end of the glass tube, the thin flanges or extension of Fig. 37 being restored to the tube around its lower edge to thicken up the same, as shown in Fig. 38, preparatory to the formation at said end of the head illustrated in Fig. 33; the mechanism for operating on the lower end of the tube (Fig. 37) to transform it to the condition shown in Fig. 38, is illustrated in detail in Figs. 8 to 11 inclusive.

In the drawings 50 designates the bed-plate of the machine, 51 a belt-wheel, 52 a driven shaft located below the bed-plate 50, 53 a driving shaft mounted in bearings 54 at the rear of the machine, and 55 a cam-shaft supported in suitable bearings over said bed-plate. Power is communicated from the shaft 52 through a sprocket chain 56 to the shaft 53 and thence through a sprocket chain 57 to the shaft 55. A clutch 58 is provided for the shaft 53 and a clutch 59 for the shaft 52.

The rotary frame which carries the glass tubes from which the bottles are made is more clearly illustrated in Figs. 1, 2 and 13, and the gearing by which said frame is given an intermittent motion is illustrated in Figs. 2, 12 and 13. The rotary frame as a whole is designated by the numeral 60 (Figs. 2 and 13), and it is mounted in a vertical bearing frame 61 secured to the bed-plate 50.

The frame 60 comprises a tubular shaft 62 having secured to its upper end a horizontal bar 63 at whose center is a hub to pass upon the upper end of the tube 62, as shown in Fig. 13. At the outer end of each arm of the bar 63 is provided a chuck 64 for holding and manipulating a glass tube 65. The chucks 64 correspond in construction with each other and each comprises a vertical tubular member 66 whose lower walls taper inwardly and on whose upper end is formed a gear wheel 67. The tubular member 66 of the clutch passes freely downwardly through an opening 68 in the bar 63 and between the lower surface of the gear-wheel 67 and the upper surface of said bar surrounding said opening are provided suitable ball-bearings, as shown at the left hand side of Fig. 13, to support said gear-wheel and its member 66 and enable the proper rotation of said gear-wheel and parts connected with it. Within the tubular member 66 is provided a vertical slidable tubular member 69 which extends above the gear wheel 67 and through which passes the glass tube 65. The lower end of the member 69 has several jaws, preferably three, 70 connected to it by links 71. The inner surfaces of the jaws 70 are smooth and adapted to evenly engage the surface of the glass tube 65, while the outer surfaces of said jaws are wedge-shaped and engage the lower inwardly inclined edges of the chuck-member 66. When the jaws 70 are allowed to descend to their lower position, shown in Fig. 13, they become clamped against the tube 65 and hold the same rigidly. When the tubular member 69 is elevated it draws the jaws 70 upwardly from the inclined lower edges of the tubular member 66 and at such time said jaws release the tube 65 and the latter is left free to descend through the chuck. The chuck-member 69 is swiveled within an opening in a pivoted arm 72 carrying upon its outer end an adjustable member 73, in this instance a bolt, which, during the rotation of the frame 60 passes over a pivoted operating arm 74 (Figs. 1 and 3) provided for the purpose of turning the arm 72 upwardly to elevate the chuck-member 69 and jaws 70, so that at such time the tube 65 may be free to descend. The point at which the tube 65 is released to descend is when said tube having had the lip, neck and shoulder or bottle-head formed on its lower end, is to be subjected at a suitable distance above said lower end to the action of the flame-jets for severing from the tube an appropriate section thereof to constitute a vial.

The frame 60 has an intermittent rotary motion imparted to it and during some of its periods of rest the chucks 64 have rotary motion imparted to them. The means for imparting motion to a chuck 64 when in the position shown at the left hand side of Figs. 13

1 and 13, comprise a rod 75 extending upwardly through the frame 60, a gear wheel 76 fastened upon the upper portion of said rod, and a pinion wheel 77 which is always in engagement with the gear-wheel 76 and with which the gear-wheel 67 of the chuck 64 is carried into mesh when the frame 60 rotates to move said chuck to the position shown in Figs. 1 and 13 with relation to said pinion-wheel. The pinion-wheel 77 is mounted on a pin 78 which extends through a plate 79 (Fig. 13) located below the gear-wheel 76 and secured upon the upper end of a stationary tube 80 disposed within the outer tube 62 of the frame 60. The lower end of the pin 78 is connected by a light spring 81 with the plate 79 and said pin is secured in the opening in said plate by means of a transverse pivot, with the result that the pinion 77 may have a limited yielding movement sufficient to relieve any jarring or harshness of engagement which might otherwise take place when the frame 60 is turned to carry the gear wheel 67 of the chuck 64 into mesh with said pinion-wheel. The lower end of the stationary tube 80 is held by a screw in a bracket-arm 82 (Fig. 13) and coöperates with said arm in supporting the frame 60 vertically. The upper end of the rod 75, which passes through the frame 60, receives a block 83 to which the inner ends of the arms 72 are pivotally connected.

The means for rotating the frame 60 with an intermittent movement from the shaft 52 comprise (Figs. 2 and 12), a beveled gear-wheel 84 on said shaft, a beveled gear-wheel 85 in mesh therewith and connected with a disk 86, and the slotted plate 87 secured by a screw, as shown in Fig. 13, upon the lower end of the tube 62 upon whose upper end the cross-bar 63 of the frame 60 is secured. The disk 86 and slotted plate 87 form a Geneva movement of known character. In the present instance the rotary frame 60 will have four periods of rest, and hence the plate 87 is formed with four slots 88 to receive the pin 89 carried by the disk 86 and said plate between said slots is recessed, as usual, to receive a peripheral portion of said disk.

The means for rotating the vertical rod 75 extending through the frame 60 and carrying at its upper end the gear-wheel 76, comprise a pulley-wheel 90 secured upon the lower end of said rod and a cord or belt 91 which extends over pulley-wheels 92 secured on the driving shaft 53. The rod 75, gear-wheel 76 and pinion 77 may continue in constant rotation, but said pinion wheel being held in a fixed location is only able to perform its functions when the gear-wheel 67 of a chuck 64 is moved into engagement with it.

I utilize the tubular member 62 of the frame 60 and the rod 75 extending through said frame as means for imparting motion through the system of gears and belts, shown in Fig. 12, to other operative parts of the machine and this feature of the structure will be explained hereinafter in connection with the description of the parts operated from said gearing.

When the frame 60 is in the position illustrated in Figs. 1 and 13, the left hand chuck 64 is in engagement with the pinion wheel 77, and, as hereinbefore indicated, the said chuck 64 is in such position during the period that the lower section of a glass tube having the vial head formed on its lower end, is being severed by the action of heat from the body of the tube. When the said left hand chuck 64, looking at Figs. 1 and 13, is by a quarter-turn of the frame 60 carried to the front or over the suction-nozzle 93, as shown in Fig. 2, said chuck will have no independent rotary movement, there being when said chuck is in such position no means provided for rotating the chuck and none being necessary, since in that position of the chuck air suction through the nozzle 93 is acting to pull downwardly and open the closed lower end of the tube. When the said chuck 64 is by a further quarter turn of the frame 60 carried from its position over the suction-nozzle 93, it will stand over the means provided for shaping and thickening up the lower end of the tube, said means being shown in detail in Figs. 8 to 11 inclusive, and since at such time it is desirable that the tube should be rotated, I provide the gear-wheel 94 with which at such position the gear-wheel 67 of the chuck passes into engagement. The gear-wheel 94 is driven from the cord or belt 95 which passes around a pulley-wheel 96 mounted on the spindle 97 (Figs. 4 and 5) supporting said gear-wheel 94. The gear-wheel 94 is loose on the spindle 97 and carries on its upper face a friction-disk 98. The pulley-wheel 96 is secured to a disk or head 99 which engages the friction disk 98, and above the pulley-wheel 96 is provided a spring 100, which acts to press the head 99 against the disk 98. When the belt 95 and pulley-wheel 96 are in motion and the head 99 is down against the disk 98, the gear-wheel 94 will be rotated, and obviously when the pulley-wheel 96 and head 99 are elevated from the disk 98, the gear wheel 94 will not have motion imparted to it. Since during the movement of the rotary frame 60 the gear wheel 67 of the chuck is carried rather quickly into mesh with the gear-wheel 94, I provide means for momentarily elevating the head 99 from the disk 98 at the time the gear-wheel 67 passes into mesh with the gear-wheel 94 and these means are illustrated in Figs. 1 and 4 and comprise a pivoted lever-arm 101 whose upper end is arranged to engage a shoulder on the pulley-wheel 96 and whose lower end is against a cam 102 on the shaft 55. During the rotation of the cam 102 a projection 103 thereon will ride against a roller carried by the lower er of the arm 101 and operate to rock said arm on its pivotal support and cause its upper end to lift the pulley-wheel and head 99 from the disk 98, and this happens at the moment it is intended the gear-wheel 67 shall pass into mesh with the gear-wheel 94. I also provide on the arm 101 a brake-arm 104 carrying at its forward end a pad, which, when the arm 101 elevates the pulley-wheel 96, engages the lower surface of the gear-wheel 94 to lightly retard the movement of the same. As further relieving the gear-wheels 67, 94 from unnecessary jarring or harsh action when they come together, I pivotally mount the spindle 97, as shown in Figs. 4 and 5, and provide in the bracket-arm 105 an enlarged hole through which said spindle passes. I also connect to the spindle 97 a coiled spring 106 which tends to draw the shaft in a direction toward the adjacent chuck 64, but allows said spindle to yield in a direction from said chuck upon the gear wheel 67 of the latter striking the gear wheel 94.

When the gear wheel 67 of the chuck is in mesh with the gear-wheel 94 and the pulley-wheel 96 has descended, the gear-wheel 94 will be rotated from the belt 95 and impart motion through the gear-wheel 67 to the chuck, with the result that the latter and the glass tube carried by it will be rapidly rotated during the operation of the means for shaping, thickening and preparing the then ragged lower edge of the glass tube. When the said chuck 64 is by the frame 60 given a further or its third quarter-movement on its cycle, it will be carried away from the gear-wheel 94 and into mesh with a similar gear-wheel 107 or to the position illustrated in Fig. 2, in which position of the chuck the means for forming the lip and neck on the end of the tube perform their duty. The gear-wheel 107 corresponds in its details with the gear-wheel 94 and its coöperating parts just described in connection with Figs. 4 and 5, and hence but brief description is necessary with regard to the gear-wheel 107. The gear-wheel 107 has on its upper face a friction disk 108, which is engaged by a head 109 connected with a pulley-wheel 110. Power is communicated to the pulley-wheel 110, head 109 and gear-wheel 107 through a belt 111 clearly illustrated in Fig. 1, and a spring 112 is utilized to press the head 109 downwardly against the disk 108. The gear-wheel 107 is supported on the upper portion of a pivoted spindle 113 connected with a spring 114, which tends to yieldingly press the gear-wheel 107 in a direction toward the gear-wheel 67 of the chuck 64 it is to engage. When the gear wheel of the chuck is about to pass into engagement with the gear-wheel 107 by which it is to be driven, the pulley-wheel 110 is elevated to free the head 109 from the friction disk 108, and the means for then elevating said pulley-wheel and head comprise a lever-arm 115 (Fig. 2) secured on a rock-shaft 116 (Fig. 1) carrying an operating arm 117 and a brake-arm 118. The arm 117 has an angular member 119 below a pivoted arm 120 which has its free end below a shoulder on said pulley-wheel. When the arm 115 is turned toward the front it will cause the rock-shaft 116 to turn the arm 117 upwardly against the pivoted arm 120 to cause the latter to elevate the pulley-wheel 110, and at the same time the brake-arm 118 will apply moderate pressure against the lower face of the gear-wheel 107. The arm 115 is actuated by a cam 121 (Fig. 1) on the cam-shaft 55. When the said chuck 64 is by the frame 60 given its fourth and final quarter movement of its cycle, it moves toward the left from the gear wheel 107 and returns to its first described position at the left of the center of the frame 60, as shown in Figs. 1 and 13, and its gear wheel 67 again passes into mesh with the transmitting pinion wheel 77, and it is at this stage that the outer end of the arm 72 above the chuck is elevated by the operating arm 74 and effects the release of the glass tube to descend to a sufficient extent for the completion and severance of a vial therefrom. The frame 60 may carry only one chuck 64 but the capacity of the machine may be increased by providing said frame with two chucks 64. When two chucks are made use of each follows the other through the cycle of four quarter-movements and the lower ends of the glass-tubes carried by them are successively subjected to the steps resulting in the formation of the vials.

Having described the construction and mode of operation of the rotary glass-tube carrying frame 60, with its chucks 64 and the means for rotating said chucks in their three positions in which their rotation is desired, I will proceed to describe the mechanisms which act against the lower portions of the tubes at the four at rest positions of said frame 60 to form the vials, and also the means which receive the severed vials and effect the flattening of their closed ends, as well as the means by which the completed vials are removed from the machine. In this portion of the description it will be convenient, since in starting the operation the lower end of the glass tube is open and of regular form, to consider that a chuck 64 when over the suction nozzle 93 (Fig. 2) received the tube and carried it first to the at rest position of the frame 60 at which the gear wheel 67 of the chuck passed into engagement with the operating gear wheel 94 and the lower end of the glass-tube while rotating was softened by the heat of flames from gas-burners 49, and then transported it to the rear position of said chuck at which its gear-wheel 67 engages the operating gear wheel 107 and said chuck holds the glass tube 65 in position to have its softened lower end acted on by the means for forming the lip, neck and shoulder thereat, as shown in about the middle portion of Fig. 2. The means for at this time acting on the lower end of the rapidly rotating glass-tube 65 are shown enlarged in Figs. 14 and 15, and a gas-burner for constantly keeping the neck-forming tools hot preparatory to this stage of the operation is shown in Fig. 1 and numbered 122. The flame at the burner 122 is constant and the burner is not of unusual construction.

The tools for forming the lip, neck and shoulder on the lower end of the glass-tube 65 are two corresponding formers 123 adjustably secured by screws to the upper arms of corresponding bell-crank levers 124 and a plug 125 adapted to enter the lower open end of the tube. The bell-crank levers 124 are pivotally secured to a cross-bar 126 and are connected by links 127 with a block 128 which is connected with the upper end of a vertical rod 129, whose lower portion extends through ears 130 of a bar 131 (Fig. 15) which is pivotally secured at its lower end to a rockable lever-arm 132. Upon the rod 129 is a spring 133 confined between a collar 134 and the upper ear 130 and normally acting to yieldingly hold the rod 129 and block 128 pressed upwardly to the extent permitted by a stop 135 provided on the rod 129 below the lower ear 130. The normal idle position of the formers 123 is illustrated in Fig. 14, and at the time the formers are to engage the lower end of the glass tube 65, the outer end of the lever arm 132 is acted on by the cam 136 to move the rod 129 upwardly and thereby through the bell-crank levers 124 cause the formers 123 to approach each other and engage opposite sides of the end of the tube 65. The plug 125 is upon the upper end of a bar or head 137, which may rest upon the block 128 when in its lower position and is secured to or formed on the upper end of a vertical rod 138 (Fig. 15) which extends downwardly through a bearing 139 and is at its lower end connected by a link 140 and collar 141, the latter being on the rod, with the inner end of a pivoted lever 142. The rear end of the lever 142 is normally held upwardly by means of a coiled spring 143 and is intended to be turned downwardly when the plug 125 is to be elevated, by means of a suitable cam 144. Upon the rod 138, between the collar 141 and a collar 145, is provided the coiled spring 146, which, when the rod 138 is elevated, becomes compressed by the contact of the collar 145 with the lower end of the bearing 139 and affords a yielding resistance to the upward movement of the rod 138 and plug 125, it being desired that the plug 125 should not enter or act against the soft glass of the tube 65 with undue harshness. The spring 146 cushions the thrust of the plug 125. The plug 125 is shown in its normal lower position and the formers 123 are shown in their normal idle position in Fig. 14, while in Fig. 2 I illustrate said plug in its upper position and said formers in their inner operative position engaged in forming the lip and neck at the lower end of the glass tube 65. After the rotary frame 60 has remained a sufficient length of time holding the glass tube 65 for the action of the formers 123 and plug 125, said frame will carry the tube with the lip and neck formed thereon to the first described position for the chuck 64 or that indicated at the left hand portion of Fig. 1, upon arriving at which position the screw 73 on the arm 72 above the chuck will pass over the arm 74 and be by said arm, when the chuck has reached its definite position, moved upwardly so as to elevate the chuck member 69 and jaws 70 to release the glass tube 65, whereupon said tube will descend to a clamp frame which I will presently describe, said tube then attaining the position illustrated in Fig. 17.

The arm 74, by which the chuck 64 is caused to release the glass tube so that it may descend for the severing operation indicated in Fig. 17, is illustrated more clearly in Figs. 1 and 3, and is pivotally supported on the upper end of a standard 147 and connected at its rear end by a link 148 with the upper horizontal arm of a bell-crank lever 149, whose other arm, indicated by dotted lines in Fig. 3, carries a roller against a cam 150. A spring 151 connected with the upper arm of the bell-crank lever 149 serves to keep the roller at the lower end of the vertical arm of said bell crank lever against the cam 150 and also to normally maintain the arm 74 in its normal inoperative position shown in Fig. 3. When the projecting portion of the cam 150 rides against the vertical arm of the bell-crank lever 149 it will cause the rear end of the pivoted arm 74 to move downwardly and the front end of said arm to move upwardly, with the result that the front end of the arm 74 will elevate the arm 72 of the chuck 64 and release the glass tube to descend to the clamp frame intended to receive it and at the time directly below the chuck 64.

The clamp frame which receives the lower end of the glass tube when the latter descends through the chuck is duplicated in the present machine, and I number the two frames, which are just alike, 152, 153, and said frames are mounted upon the outer ends of a centrally pivoted horizontal arm 154, as shown in Fig. 3. The details of the frames 152, 153 are clearly illustrated in Fig. 17 and Figs. 25 to 28 inclusive. After the frame shown in Fig. 17 and which for convenience is indicated by the numeral 152, receives the glass tube and the severing of the lower section of the tube has been completed, the bar 154 turns on its pivotal support and carries the severed bottle to another position where the operation of flattening the closed end of the bottle takes place. The arm 154 therefore is swiveled and carries two corresponding frames 152, 153 each of which upon receiving the lower end of the glass tube remains stationary, except for having a rotary motion, until the bottle has been severed, and then moves on through the line of a quarter circle (to the rear and left looking at Fig. 1) to the position at which the flattening of the closed end of the bottle takes place. Each frame 152, 153 comprises a cross-bar 155 secured upon the upper end of a sleeve 156 (Fig. 25), vertical rods 157 secured to the ends of the bar 155, and a slidable frame mounted on said rods 157 and comprising a cross-bar 158 and tubular rods 159, which are upon the rods 157 and adapted to have a vertical movement thereon. The upper ends of the tubular members 159 are connected by a bar 160 which afford horizontal guides for clamping members 161, 162 (Fig. 28). The clamping members 161, 162 are recessed at their facing edges to engage the glass tube when the same descends into the clamping frame, said members 161, 162 being in their separated position at the time the tube descends. The clamping members or jaws 161, 162 have depending arms 163, which are connected by links 164 with the upper arms of corresponding bell crank levers 165 whose lower arms are at their outer ends connected by links 166 with a head 167 which is vertically movable upon a central tubular rod 168 and yieldingly pressed upon by a coiled spring 169. The tubular rod or shaft 168 extends vertically through the sleeve 156, cross-head 167, spring 169 and cross bar 158, and is vertically movable with the upper frame comprising the cross-bars 158, 160 and tubular rods 159. The frame 152 is also provided with a plate 170 having a vertical slot therein to receive the screw 171 by which said plate is adjustably fastened to the cross-bar 158. The upper end of the plate 170 turns inward horizontally, as at 172 (Figs. 25, 27), and contains an opening directly above the opening through the tubular shaft 168. Upon the upper bent end 172 of the plate 170 is provided a pad 173 upon which the descending glass tube will fall when released by its chuck to descend, and said pad has an opening in line with the opening in the upper bent end of said plate 170. When the frame 152 is attaining its position below the chuck 64 to receive the glass tube, the lower end of the tubular shaft 168 rides up an incline or cam 174 (Fig. 17) and passes over upon an adjustable rest 175 carried by a small bracket secured to the inner end of a pivoted lever arm 176, whose outer end is in engagement with a cam 177, which cam, when the parts are in the position shown in Fig. 17, maintain the tubular shaft 168 in its upper position a sufficient length of time for the descending glass tube to pass between the then separated clamping jaws 161, 162 and engage the seat 173 of the frame 152. When the tubular shaft 168 is moved upwardly it carries with it the cross-bars 158, 160, bell-crank levers 165 and links 166, moving said parts from their position shown in Fig. 25 to that illustrated in Fig. 17 and causing the bar 160 to engage the collars 48 on the upper ends of the rods 157. When the bar 160 reaches the collars 48 it becomes arrested thereby but the shaft 168 continues its upward movement to a slight extent (compressing the spring 169) sufficient to cause the links 166 and bell-crank-levers 165 to move the clamping jaws 161, 162 in a direction from each other or to their open position to receive the glass tube. After the tube has descended between the clamping jaws 161, 162 the cam 177 will turn its receding portions against the lever arm 176 and permit the tubular shaft 168 and parts carried thereby to settle downwardly to a sufficient extent to enable the clamping jaws 161, 162, to move toward each other and against the glass tube (Fig. 28).

The frames 152, 153 while carried by the horizontal bar 154 are independently rotatable when said bar 154 is at rest. Upon the lower end of the sleeve 156 of each frame 152, 153 is secured a gear wheel 178 which will be carried into engagement with gear wheels 179, 180 in succession, the gear wheel 178 of the frame 152 when performing the duty illustrated in Fig. 17, being in mesh with the gear wheel 179 (Fig. 3). After the stage of the operation on the bottle indicated in Fig. 17 has been completed and said frame 152 carries the substantially completed bottle to the position at which its closed end is flattened, the gear wheel 178 of said frame 152 will pass into engagement with the gear wheel 180. The gear wheels 179, 180 are driven from the gearing and belt mechanism shown in Fig. 12, and hence when the gear wheels 178 of the frame 152, 153 pass into engagement with said gear wheels 179, 180 said frames will be rapidly rotated, movement being communicated through the sleeve 156 to the cross-bar 155 and rods 157, and through said rods to the cross-bars 158, 160 and parts connected therewith, whereby the glass tube or bottle held by the clamping jaws 161, 162 is caused to rapidly rotate. When the frame 152 is in the position to receive the glass tube, it will be slightly below the two gas-burners 181, 182 (Figs. 1, 3 and 16), and said burners will issue jets of flame against the glass tube held by said frame 152 and the chuck 64 above it and by their action coupled with the rapid rotation of the frame, chuck and glass tube, gradually sever the lower section of the tube from the body portion thereof in a manner well understood by workers in glass and as is represented in Fig. 17 and Fig. 34, the upper end of the lower section severed from the body of the tube being closed and the lower end of the body of the tube being closed by the action of the heat and the force of the jets on the glass. The frame 152 after the lower section of the glass tube has been severed to form a vial will be swung rearwardly and toward the left (looking at Fig. 1) from its position below the left hand chuck 64 to a position below the plate 183 (Fig. 3) and carry its gear wheel 178 into mesh with the gear wheel 180. Upon the frame 152 reaching the position below the plate 183 and with its gear wheel 178 in mesh with the gear wheel 180, the lower end of the tubular shaft 168 will ride over the opening 184 in a block 185 (Figs. 1, 3 and 19) secured on the bed-plate 50 and in communication with a blow-pipe 186 through which air will be delivered into the shaft 168 and by said shaft conducted to within the substantially completed glass bottle 187 held by the clamping frame.

The air pipe 186 is shown in Figs. 1 and 20, and as indicated in Fig. 20, said air pipe has an opening in it below the upper flat end of a lever 188, which end, when in its lower position, will close said opening. The air is constantly passing through the pipe 186, and when the lever 188 is in its upper position, as shown in Fig. 20, the air will idly escape through the opening 189, and the lever 188 will always remain in its upper position except when it is desired to deliver the air through the tubular shaft 168 into a bottle being finished, and at that time the lever 188 is moved downwardly by a cam 190 secured on the cam shaft 55. The purpose in delivering air into the vial 187 is to press upwardly any depressed portions of the closed end of the inverted vial, said end of the vial being still hot from its contact with the flame jets from the burners 181, 182.

In order that the air delivered into the vial 187 may act efficiently, I provide what I have termed the patter or plate 183, which as may be seen from Fig. 3 is directly over the vial 187 and shown as having descended to engage the upper closed end of the vial. The plate 183 is secured on the lower end of a spindle 191, on whose upper end is a suitable weight 192 tending to keep the plate 183 in its lower position. The spindle 191 which carries both the plate 183 and weight 192 is movable vertically in the outer end of a bracket 193 secured to a vertical rod 194 which is guided in bearings 195 and connected with a lever arm 196 by a link 197. A coiled spring 198 yieldingly draws upwardly on the rod 194 and normally holds the patter or plate 183 above the plane of the closed end of the vial. At the time when it is desired to have the patter or plate 183 descend against the closed end of the vial which is at the same time that air is admitted to the vial, a cam 199 acts against the lever 196 to pull downwardly on the rod 194 through the medium of the link 197, and this downward movement of said rod results in the bracket 193 descending and in the patter or plate 183 being brought into contact with the then upper closed end of the inverted vial, as shown in Fig. 3. The admission of the air within the vial and the application of the plate 183 to the exterior of the end thereof is substantially simultaneous, and the air presses the end of the vial against the plate 183 which is smooth and preferably lubricated.

The operation of flattening the closed end of the vial is of momentary duration and when the same has been completed the clamp-frame 152 holding the finished vial is carried by the bar 154 from position below the plate 183 on the line of a quarter-circle around to the left and toward the front until it reaches the idle at rest position occupied in Fig. 1 by the frame 153, and thence said frame 152 holding the finished vial is carried toward the front and right through the line of another quarter-circle to its front at rest position represented as occupied by the frame 153 in Fig. 3, and in this position of said frame 152 the finished vial held by it is extracted therefrom by the suction means presently to be described. When the frame 152 is moving to its front or discharge position the lower end of the shaft 168 thereof rides up an incline 200 (Figs. 1 and 3) on the bed-plate 50 and effects the outward movement of the clamping jaws 161, 162 from the vial, thereby releasing the vial to the extracting means therefor.

The means for extracting the vial from the frame 152 when the latter is at its front or discharge position are shown in Figs. 1, 3, 22, 23 and 24 and comprise a suction-nozzle 201, a vertically movable air-pipe 202 connected therewith, a flexible air-tube 203 connected with said pipe, a bracket-arm 204 supporting said pipe, a vertically movable tubular rod 205 on which said bracket is adjustably secured, a stationary rod 206 on which said tubular rod has its movement, a pin 207 on said stationary rod and extending into a slot 208 having an inclined and off-set lower end portion 209 formed in said tubular rod, and means for raising and lowering said tubular rod 205 comprising a link 210 connected at its upper end to a sleeve 211 loose on said rod 205 and below a collar 212 fast on said rod, a pivoted lever 213 pivotally connected at one end to the lower end of said link 210, a cam 214 on the shaft 55 for operating said lever and link to lower the tubular rod 205 and nozzle 201 so that the latter may engage a vial held in the clamp-frame, and a spring 215 normally acting to keep the nozzle 201 in an elevated position and said lever against said cam. The pipe 202 has an adjustable stop-collar 216 on it to engage the bracket 204 and suspend the nozzle 201, and said pipe may move freely within the bracket 204 when said nozzle is lowered against a vial and then elevated with the same adhering thereto. The bracket 204 is normally held in its elevated position and stands outwardly toward the front, as shown in Fig. 1. When the nozzle 201 is to take a completed vial from a clamp-frame (152) the cam 214, lever 213 and link 210 move the tubular rod 205 downwardly and when the inclined portion of the slot 208 rides against the fixed pin 207 the rod 205 will turn or swivel on the rod 206 and swing the bracket 204 inwardly or toward the rear until the nozzle 201 is directly over the finished vial, and thereupon the continued descent of the rod 205 and bracket 204 will cause the nozzle 201 to descend directly upon and by reason of its suction cause the vial to adhere thereto, after which, the cam 214 receding from the lever 215, the spring 215 will elevate the link 210 and rod 205 and the inclined portion of the slot 208 will cause the bracket 204 to swing outwardly to the position shown in Fig. 1, the nozzle 201 carrying the vial (Fig. 24) with it, at which position the air suction is cut off from the nozzle 201 and the vial is thereby released to fall upon a chute or into any suitable receptacle arranged to receive it. The rod 205 and nozzle 201 are shown in their lower position in Figs. 3, 22, 23 and 24 ready to take the vial from the clamp-frame below the nozzle. The nozzle 201 is allowed a limited independent vertical play so that it may yieldingly press upon the vials, and the bracket 204 is adjustable to suit vials varying in length. The air-suction is cut-off from the tube 203, pipe 202 and nozzle 201 at the moment it is desired that said nozzle shall release or discharge the vial held by it, by means of a cam 217 on the shaft 55 and a rotary valve 218 in a casing 219 interposed in said tube, as will be understood from Figs. 1 and 21.

I have described the four positions of the clamp-frames 152, 153 carried by the bar 154, at which each frame first receives the severed vial, then carries it below the plate 183 where its bottom is flattened, then carries it to the dead position occupied in Fig. 1 by the frame 153, and then carries it to its discharge position (Fig. 3) where the suction-nozzle 201 removes it, as just hereinbefore explained. I will now describe the mechanism for turning the bar 154 to carry the clamp-frames 152, 153 to their several positions and the means for independently rotating said frames when in their first position to receive a vial and in their second position at which the bottom of the vial is flattened.

The bar 154, which constitutes a centrally pivoted horizontal frame, is secured to a vertical sleeve 220 (Figs. 3 and 12) and has secured to its lower end a gear wheel 221 which receives motion from the outer sleeve 62 of the frame 60 (Fig. 13) through the intermeshing gear wheels 222, 223, said wheel 222 being secured on said sleeve. Since the frame 60 has a four-movement timed rotation imparted to it from the slotted plate 87, it will through the gear-wheels 222, 223 and 221 communicate a like movement to the frame 154, and hence said frames 60 and 154 will coöperate harmoniously.

Each clamp-frame 152, 153 has a gear-wheel 178 and will be rotated, as hereinbefore described, when said gear-wheel passes successively into mesh with the gear-wheels 179, 180. The gear-wheels 179, 180 are secured on the upper ends of spindles 224, 225, respectively, (Figs. 3 and 12) and on the lower ends of these spindles are respectively secured pulley-wheels 226, 227, which are respectively connected by belts 228, 229 with pulley-wheels 230, 231, respectively, on a vertical shaft 232, which has a pulley-wheel 233 connected by a belt or cord 234 with a pulley-wheel 235 secured on the vertical rod 75 of the frame 60 (Fig. 13). The rod 75 has a constant rotation from the main shaft 53 through the belt or cord 91 and pulley-wheel 90, and through the wheel 235 belt or cord 234 and connected wheels and belts just described imparts constant rotation to the gear wheels 179, 180, with the result that whenever a gear wheel 178 of a clamp-frame (152, 153) passes into mesh with either of said gear-wheels 179, 180, said clamp-frame will be caused to independently rotate.

The gas-pipes for the burners 181, 182 are shown as extending up through the sleeve or tubular spindle 220, as at 236.

From the foregoing description given in connection with the rotary frame 60 carrying one or more chucks 64 for the glass tubes and the rotary frame 154 carrying one or more clamp-frames 152, 153, it will be understood how the first bottle or vial is formed from the lower end of a glass tube freshly given to a chuck 64 and how said bottle or vial is removed from the machine. It has been explained that in the severance of the lower end section of the glass tube for a vial, the upper end of said section and the lower end of the body of the tube above it become closed by the glass softened and driven inwardly by the flame-jets. The glass tube after the first vial has been made therefrom, therefore requires special treatment adapting its lower end to be transformed into a lip, neck and shoulder construction for a vial. The vials are to be made one after another from a glass tube carried by a chuck 64 and at the end of each revolution of a chuck 64 with the frame 60, a vial is delivered to one of the clamping frames 152, 153 and by it carried first to the bottom-flattening means and thereafter to position for its removal by the suction nozzle 201. My machine therefore comprises means for acting against the closed lower end of the glass tube from which a vial has been severed by the flame-jets, for first opening said end and then shaping up the edges of said end preparatory to the formation thereat of the lip, neck and shoulder by the forming tools 123, 125 hereinbefore described.

The means for opening the closed lower end of the glass tube comprises a suction nozzle 93 (Figs. 1, 6 and 7), a vertical frame 237 in which said nozzle may have a vertical movement, an air-pipe 238 through which suction is created within the nozzle 93, a pivoted lever 239 having its forward end below a loose collar 240 on the lower end of the stem of said nozzle, and a cam 241 on the shaft 55 for acting against said lever to press the nozzle 93 upwardly. On the stem of the nozzle 93 is a fixed collar 242 and between this collar and the loose collar 240 is confined a coiled spring 243 which cushions the nozzle when the latter is pressed upwardly by the lever 239 against the closed lower end of the glass tube to be opened by it. After a vial has been severed from the lower portion of a glass tube, the frame 60 makes a quarter turn carrying the chuck 64 holding said tube to the front and toward the right, looking at Fig. 1, and stopping when said chuck and tube are centrally over the suction nozzle 93, and at this time the cam 241 acts against the lever 239 to move the nozzle 93 upwardly into direct engagement with the then closed and still soft lower end of the glass tube, with the result that the suction through the nozzle will draw the glass closing said end downwardly to approximately the condition represented in Fig. 37. After the lower end of the tube has been opened by the nozzle 93, the cam 241 will permit the said nozzle to descend free from the tube, and thereupon the frame 60 will make another quarter turn to carry the chuck 64 holding the tube from over the nozzle 93 to the position at which the right hand chuck is shown in Fig. 1, during which movement of the tube some of the thin glass films formed on its lower end by the suction through the nozzle 93 will be carried against and broken off by an arm 244 secured to the standard 61 (Fig. 2) and projecting in the path of the extreme lower edges of the opened and somewhat elongated tube.

When the chuck 64 carrying the glass tube reaches and comes to rest at the position at which the right hand chuck 64 is shown in Fig. 1, the end of the tube will be acted on by flames from the gas burners 49 and the tube will also be rapidly rotated, the chuck receiving its movement from the gear wheel 94, and at this time the rough, thin and irregular lower edges of the tube, softened by heat from the burners 49, will be thickened and prepared by a water-cooled plug or reamer 245 (Figs. 8, 9, 10, 11) for the succeeding step in the operation which is the formation of the lip, neck and shoulder on the end of the tube. The reamer 245 is in the form of a rod containing a chamber 246 and having an inlet 247 and an outlet 248 for water, and said rod having on its upper end the reamer-tool proper 249 which has a blunt spear shape, being flat at opposite sides and pointed. The reamer 245 is supported, in bearings 250, by a frame 251 having a table 252 directly over the reamer and containing a hole 253 through which the reamer-tool 249 may move vertically. The reamer 245 is moved upwardly so that the tool 249 may engage and enter the lower end of the tube 65 by a lever 254 connected at one end through a link 255 with the body of the reamer and at its other end being engaged by the cam 256 on the shaft 55. When the cam 256 presses the rear end of the lever 254 downwardly, the forward end of said lever elevates the reamer to engage the lower end of the rotating glass tube. After the reamer has performed its duty the cam 256 permits a spring 257 to assure the descent of the same. The condition in which the lower end of the glass tube is left by the reamer is substantially shown in Fig. 38, the turned-in formation shown being caused by the force of the flames from the gas-burners 49 after the reamer descends and before the frame 60 carries the tube from the neighborhood of said burners. After the lower edge of the glass tube has been prepared by the reamer for the next step in the operation, the frame 60 carrying the chuck 64 holding the tube will make another quarter turn and carry said chuck over the lip and neck forming mechanism (Figs. 2, 14, 15) and the lower end of the tube between the formers 123, which thereupon will proceed with their work in the manner hereinbefore described. On the next quarter turn of the frame 60 to carry the chuck and tube from the lip and neck forming tools, said chuck will pass to the position occupied by the left hand chuck 64 in Fig. 1, and thereupon the arm 74 will elevate the clamping members in the chuck and allow the tube to descend into the clamping-frame 152 then below it, whereupon the flame-jets from the burners 181, 182 will sever the vial from the tube and said frame 152 will carry the vial to the bottom flattening means and finally to a position at which the nozzle 201 may take it, as hereinbefore described with reference to the first vial made from the glass tube. The complete vials are therefore made, one after another, from the advance end of a tube, the entire manufacture being automatic.

In the machine presented herein the frame 60 carries two chucks 64 and consequently two glass tubes, and these tubes follow one another through the successive treatments by which the vials are produced from their lower end portions, both tubes being, however, acted on at the same time in their respective stages. For illustration, in the position of the frame 60 and chucks 64 shown in Fig. 1, the left hand tube 65 will be having a vial severed from its lower end, while the lower end of the right hand tube is being acted on by the reamer 245. When the frame 60 and chucks 64 are given a quarter turn from their position shown in Fig. 1, the then front tube 65 will be over the suction nozzle 93 and the then rear tube 65 between the lip and neck formers 123.

With respect to the frame 154 carrying the clamping frames 152, 153, it may be said that when one of said clamping frames is holding a vial below the flattener plate 183, the other of said frames is holding its vial in position to be taken by the nozzle 201.

In the timing of the machine, I have found it to be desirable to allow the frame 60 to have a somewhat longer period of rest when it is at the position shown in Fig. 1, in which position a vial is severed from the left hand tube and the lower end of the right hand tube is reamed, since the operations performed when the frame 60 is in that position require more time than the operations which are performed when the frame 60 makes a quarter turn from that position. In the arrangement of driving mechanism I have found it convenient to use, the shaft 55 makes one rotation while the shaft 52 makes two rotations and remains at rest a sufficient period for it to have made a third rotation; and it is during this period that the shaft 52 is at rest that I gain the increased time for the frame 60 to remain in the position in which it is shown in Fig. 1. The clutch 59 (Figs. 1, 12, 29, 30, 31) is a pin clutch and when its two parts are connected by the pin 258 the shaft 52 will be in rotation, but I provide a cam 259 on the shaft 55 and a lever 260 coacting therewith to withdraw the pin 258 at the end of each two rotations of the shaft 52 and hold it withdrawn for a period equal to the time that would be required for one more rotation of said shaft, thereby securing the at-rest period for the shaft and the frame 60 hereinbefore referred to. The lever 260 has a wedge-acting head 261 which takes a position to stand in the path of the head of the pin 258 and effect the withdrawal of said pin at the periods above-mentioned. A spring 262 keeps the upper end of the lever 260 against the cam 259 and the cam controls the periods at which the lower end or head of said lever shall effect the withdrawal of the pin 258.

I do not limit my invention to any special timing of the operative parts of the machine, nor to the driving and actuating mechanisms hereinbefore described. I have shown and described the preferred embodiment of my invention and one I have used with entire success, but I do not confine my invention to the details and arrangements shown, since obviously many changes may be made in them without departing from my invention.

What I claim as my invention and desire to secure by Letters-Patent, is:

1. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, and burners for severing such length from the tube and closing the adjacent ends of the same and the tube at the point of severance, the severed length constituting a vial; substantially as set forth.

2. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for flattening the closed end of the vial held by the clamp-frame, and means for actuating said frame to carry the vial to a point of discharge; substantially as set forth.

3. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for flattening the closed end of the vial held by the clamp-frame comprising a plate to engage the exterior of said end and means for forcing air into the vial, and means for actuating said frame to carry the vial to a point of discharge; substantially as set forth.

4. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, and means for actuating said frame to carry the vial to a point of discharge; substantially as set forth.

5. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for actuating said frame to carry the vial to a point of discharge, and means for automatically withdrawing the vial from said frame and delivering it from the machine; substantially as set forth.

6. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for actuating said frame to carry the vial to a point of discharge, and means for automatically withdrawing the vial from said frame and delivering it from the machine and comprising a suction nozzle means for applying the same to the closed end of the vial and then moving it with the vial adhering thereto to the point of delivery, and means for then cutting off the air suction from the nozzle; substantially as set forth.

7. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for flattening the closed end of the vial held by the clamp-frame, and means for automatically withdrawing the vial from said frame and delivering it from the machine; substantially as set forth.

8. In a machine for forming vials from a glass tube, a chuck for holding the tube with an end thereof exposed, a frame for carrying the chuck and tube along a given path, means for softening the end of said tube, means for forming the vial-neck on the softened end of the tube, means effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for flattening the closed end of the vial held by the clamp-frame, and means for automatically withdrawing the vial from said frame and delivering it from the machine, and comprising a suction nozzle, means for applying the same to the closed end of the vial and then moving it with the vial adhering thereto to the point of delivery, and means for then cutting off the air suction from the nozzle; substantially as set forth.

9. In a machine for forming vials from a glass tube, a carrying frame adapted to hold the tube, means for forming a vial-neck on the end of the tube, burners for then severing a suitable length from the tube to constitute a vial and at the same time closing the adjacent ends of said length and the tube, and means for flattening the closed end of the vial comprising a plate to engage the exterior of said end and means for delivering air under pressure into the vial; substantially as set forth.

10. In a machine for forming vials from a glass tube, a carrying frame adapted to hold the tube, means for forming a vial-neck on the end of the tube, burners for then severing a suitable length from the tube to constitute a vial and at the same time closing the end thereof at the line of severance, and means for flattening the closed end of the vial comprising a plate to engage the exterior of said end, and means for delivering air under pressure into the vial; substantially as set forth.

11. In a machine for forming vials from a glass tube, a carrying frame adapted to hold the tube, means for forming a vial-neck on the end of the tube, burners for then severing a suitable length from the tube to constitute a vial and at the same time closing the end thereof at the line of severance, means for flattening the closed end of the vial, and means for automatically withdrawing the vial from its holding means and delivering it from the machine and comprising a suction nozzle, means for applying the same to the closed end of the vial and then moving it with the vial adhering thereto to the point of delivery, and means for then cutting off the air suction from the nozzle; substantially as set forth.

12. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for forming a vial-neck on the prepared end of the tube, means for effecting the feeding of a definite length of the tube through the chuck, and burners for severing such length from the tube and closing the adjacent ends of the same and the tube at the line of severance, the severed length constituting a vial; substantially as set forth.

13. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for forming a vial-neck on the prepared end of the tube, means for effecting the feeding of a definite length of the tube through the chuck, and burners for severing such length from the tube and closing the adjacent ends of the same and the tube at the line of severance, the severed length constituting a vial, and the means for opening the closed end of the tube comprising a suction nozzle adapted to said end for drawing the glass which closes the end of the tube in a direction outwardly therefrom; substantially as set forth.

14. In a machine for forming vials from a glass tube having a closed end, a chuck for holding the tube with said end thereof exposed, a frame for carrying the chuck and tube along a given path, a suction nozzle for drawing the glass which closes the end of the tube in a direction outwardly therefrom whereby a depending flange becomes formed along the edge of the then open end of the tube, an arm standing in the path of said flange for breaking off the lower portion of the same, means for shaping-up the edges of the then open end of the tube, means for forming a vial-neck on the prepared end of the tube, means for effecting the feeding of a definite length of the tube through the chuck, and burners for severing such length from the tube and closing the adjacent ends of the same and the tube at the line of severance, the severed length constituting a vial; substantially as set forth.

15. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for forming a vial-neck on the prepared end of the tube, means for effecting the feeding of a definite length of the tube through the chuck, and burners for severing such length from the tube and closing the adjacent ends of the same and the tube at the line of severance, the severed length constituting a vial, and the means for shaping-up or preparing the opened lower end of the tube comprising means for softening the glass at said end, a reamer, means for causing the reamer to enter the end of the tube, and means for rotating the tube on the reamer; substantially as set forth.

16. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for preparing a vial-neck on the prepared end of the tube, means for effecting the feeding of a definite length of the tube through the chuck, burners for severing such length from the tube to constitute a vial and closing the adjacent ends of the same and the tube, a carrier clamp frame to receive the end of the tube when it feeds through the chuck and retain the severed vial, means for flattening the closed end of the vial held by the clamp-frame, and means for actuating said frame to carry the vial to a point of discharge; substantially as set forth.

17. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for preparing a vial-neck on the prepared end of the tube, means for effecting the feeding of a definite length of the tube through the chuck, burners for severing such length from the tube to constitute a vial and closing the adjacent ends of the same and the tube, a carrier clamp frame to receive the end of the tube when it feeds through the chuck and retain the severed vial, means for flattening the closed end of the vial held by the clamp-frame comprising a plate to engage the exterior of said end and means for forcing air into the vial, and means for actuating said frame to carry the vial to a point of discharge; substantially as set forth.

18. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for preparing a vial-neck on the prepared end of the tube, means for effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for actuating said frame to carry the vial to a point of discharge, and means for automatically withdrawing the vial from said frame and delivering it from the machine; substantially as set forth.

19. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for preparing a vial-neck on the prepared end of the tube, means for effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for actuating said frame to carry the vial to a point of discharge, and means for automatically withdrawing the vial from said frame and delivering it from the machine and comprising a suction nozzle means for applying the same to the closed end of the vial and then moving it with the vial adhering thereto to the point of delivery, and means for then cutting off the air suction from the nozzle; substantially as set forth.

20. In a machine for forming vials from a glass tube having a closed end, a chuck for holding the tube with said end thereof exposed, a frame for carrying the chuck and tube along a given path, means for opening the closed end of the tube, means for shaping-up the edges of the then open end of the tube, means for preparing a vial-neck on the prepared end of the tube, means for effecting the feeding of a definite length of the tube through the chuck, burners for severing such length from the tube to constitute a vial and closing the adjacent ends of the same and the tube, a carrier clamp-frame to receive the end of the tube when it feeds through the chuck and retain the severed vial, means for flattening the closed end of the vial held by the clamp-frame, and means for automatically withdrawing the vial from said frame and delivering it from the machine; substantially as set forth.

21. In a machine for forming vials from a glass tube, a carrying frame adapted to hold the tube, vial neck-forming mechanism, means adapted to sever the tube transversely and close the end of the severed section, means for actuating said frame to repeatedly successively present the advance end of the tube to said neck-forming mechanism and the body of the tube to said burners for the formation of the vials in succession therefrom, and means for intermittently feeding the tube for the formation of the vials therefrom; substantially as set forth.

22. In a machine for forming vials from a glass tube, a carrying frame adapted to hold the tube, vial neck-forming mechanism, burners adapted to sever the tube transversely and close the end of the severed section, means for actuating said frame to repeatedly successively present the advance end of the tube to said neck-forming mechanism and the body of the tube to said burners for the formation of the vials in succession therefrom, means for intermittently feeding the tube for the formation therefrom of the vials, and means for flattening the closed ends of said vials; substantially as set forth.

23. In a machine for forming vials from a glass tube, a carrying frame adapted to hold the tube, vial neck-forming mechanism burners adapted to sever the tube transversely and close the end of the severed section, means for actuating said frame to repeatedly successively present the advance end of the tube to said neck-forming mechanism and the body of the tube to said burners for the formation of the vials in succession therefrom, means for intermittently feeding the tube for the formation therefrom of the vials, and means for flattening the closed ends of said vials, comprising a plate to engage the exterior of the closed end of the vial and means for delivering air under pressure into the vial; substantially as set forth.

24. In a machine for forming vials from a glass tube, a carrying frame adapted to hold the tube, vial neck-forming mechanism, burners adapted to sever the tube transversely and close the end of the severed section, means for actuating said frame to repeatedly successively present the advance end of the tube to said neck-forming mechanism and the body of the tube to said burners for the formation of the vials in succession therefrom, means for intermittently feeding the tube for the formation of the vials therefrom, and air-suction means for automatically withdrawing the vials as formed from the machine; substantially as set forth.

25. In a machine for forming vials from a glass tube, a carrying frame adapted to hold the tube, vial neck-forming mechanism, burners adapted to sever the tube transversely and close the end of the severed section, means for actuating said frame to repeatedly successively present the advance end of the tube to said neck-forming mechanism and the body of the tube to said burners for the formation of the vials in succession therefrom, means for intermittently feeding the tube for the formation of the vials therefrom, and means for removing the vials in succession as formed and comprising a suction nozzle, means for applying the same to the closed end of the vial and then moving it with the vial adhering thereto to the point of delivery, and means for then cutting off the air suction from the nozzle; substantially as set forth.

26. In a machine for forming vials from a glass tube, a carrying frame adapted to hold the tube, vial neck-forming mechanism, burners adapted to sever the tube transversely and close the end of the severed section, means for actuating said frame to repeatedly successively present the advance end of the tube to said neck-forming mechanism and the body of the tube to said burners for the formation of the vials in succession therefrom, and means for intermittently feeding the tube for the formation of the vials therefrom, combined with a movable clamp-frame having jaws adapted to engage the tube transversely, means for centering said frame below the tube to receive the end of the same at the periods the tube is to feed through its holding frame, means for closing said jaws on the tube, and means for actuating said clamp-frame to carry away the vials as severed from the tube to a position for their discharge; substantially as set forth.

27. In a machine for forming vials from a glass tube, a carrying frame adapted to hold the tube, vial neck-forming mechanism, burners adapted to sever the tube transversely and close the end of the severed section, means for actuating said frame to repeatedly successively present the advance end of the tube to said neck-forming mechanism and the body of the tube to said burners for the formation of the vials in succession therefrom, and means for intermittently feeding the tube for the formation of the vials therefrom, combined with a rotary clamp-frame having jaws adapted to engage the tube transversely, means for centering said frame below the tube to receive the end of the same at the periods the tube is to feed through its holding frame, means for closing said jaws on the tube, means for actuating said clamp-frame to carry the vials as severed from the tube to a position for their discharge, means for opening said jaws to release the vial, and automatic air-suction means for withdrawing the released vial from said clamp-frame and delivering it from the machine; substantially as set forth.

28. In a machine for forming a vial from a glass tube, rotary means for concentrically clasping and holding the tube vertically with an end thereof exposed, means for forming a vial-neck on the exposed end of the vertical tube, and burners for severing a suitable length from the tube to constitute a vial and at the same time closing the end of the vial at the line of severance; substantially as set forth.

29. In a machine for forming a vial from glass tube, rotary means for concentrically clasping and holding the tube vertically with an end thereof exposed, means for forming a vial-neck on the exposed end of the vertical tube, burners for severing a suitable length from the tube to constitute a vial and at the same time closing the end of the vial at the line of severance, and means for flattening the closed end of the vial; substantially as set forth.

Signed at New York city, in the county of New York and State of New York, this 3rd day of January A. D. 1910.

WILLIAM R. BURROWS.

Witnesses:
CHAS. C. GILL,
ARTHUR MARION.